US011719350B2

(12) United States Patent
Dragojlov et al.

(10) Patent No.: US 11,719,350 B2
(45) Date of Patent: Aug. 8, 2023

(54) COOLANT FLOW CONTROL MODULE

(71) Applicant: Vitesco Technologies USA, LLC, Auburn Hills, MI (US)

(72) Inventors: Alexander Dragojlov, Chatham (CA); Benjamin MacNally, Chatham (CA); Russell M Modien, Chatham (CA); Jeremy Daniel Schmidt, Chatham (CA); Kris Leo Barboza, Chatham (CA); Qingqing Xie, Chatham (CA); David Rene Forgeron, Tilbury (CA); Jürgen Luft, Macomb, MI (US)

(73) Assignee: VITESCO TECHNOLOGIES USA, LLC, Auburn Hills, MI (US)

( * ) Notice: Subject to any disclaimer, the term of this patent is extended or adjusted under 35 U.S.C. 154(b) by 258 days.

(21) Appl. No.: 16/838,665

(22) Filed: Apr. 2, 2020

(65) Prior Publication Data
US 2020/0393053 A1 Dec. 17, 2020

Related U.S. Application Data

(60) Provisional application No. 62/961,961, filed on Jan. 16, 2020, provisional application No. 62/860,610, filed on Jun. 12, 2019.

(51) Int. Cl.
*F16K 11/16* (2006.01)
*F28F 27/02* (2006.01)

(52) U.S. Cl.
CPC ............ *F16K 11/165* (2013.01); *F28F 27/02* (2013.01)

(58) Field of Classification Search
CPC ........ F28F 27/02; F16K 11/165; F16K 27/02; F16K 27/003; F16K 27/067; F16K 11/0876; F16K 11/085–0856
See application file for complete search history.

(56) References Cited

U.S. PATENT DOCUMENTS

| 3,499,467 A | 3/1970 | Mccord |
| 3,630,231 A | 12/1971 | Miller |

(Continued)

FOREIGN PATENT DOCUMENTS

| CN | 2093285 U | 1/1992 |
| CN | 2198478 Y | 5/1995 |

(Continued)

OTHER PUBLICATIONS

Chinese Office Action dated Dec. 3, 2021 for corresponding Chinese Patent Application No. 202010540338.1.

(Continued)

*Primary Examiner* — Seth W. Mackay-Smith

(57) ABSTRACT

A coolant flow control module, having a first outer housing, a first rotor located in the first outer housing, a second outer housing adjacent the first outer housing, and a second rotor disposed in the second outer housing. The second rotor is engaged with the first rotor such that the first rotor and second rotor rotate in unison. An actuator is connected to the first rotor, a first plurality of ports is integrally formed as part of the first outer housing, and a second plurality of ports is integrally formed as part of the second outer housing. The actuator rotates the first rotor and second rotor to at least one of a plurality of orientations such that fluid is able to flow through the first plurality of ports and the first rotor, and fluid is able to flow through the second plurality of ports and the second rotor.

22 Claims, 24 Drawing Sheets

(56) References Cited

U.S. PATENT DOCUMENTS

| | | | |
|---|---|---|---|
| 3,927,693 A | 12/1975 | Johnston | |
| 4,108,207 A | 8/1978 | Doody | |
| 4,445,540 A * | 5/1984 | Baron | F16L 45/00 |
| | | | 137/625.43 |
| 4,655,252 A * | 4/1987 | Krumhansl | F16K 11/0853 |
| | | | 251/59 |
| 5,967,185 A | 10/1999 | Baruschke et al. | |
| 6,295,828 B1 | 10/2001 | Koo | |
| 6,539,899 B1 | 4/2003 | Piccirilli et al. | |
| 6,568,428 B2 * | 5/2003 | Pecci | F16K 27/003 |
| | | | 137/595 |
| 6,688,333 B2 | 2/2004 | McLane et al. | |
| 8,322,367 B2 * | 12/2012 | Harris | F16K 27/003 |
| | | | 137/884 |
| 8,584,708 B2 * | 11/2013 | Bartnick | F16K 11/165 |
| | | | 137/870 |
| 8,671,982 B2 * | 3/2014 | Stoermer | F16K 11/0856 |
| | | | 123/41.1 |
| 8,740,186 B2 | 6/2014 | Lauridsen | |
| 9,212,751 B2 | 12/2015 | McLane et al. | |
| 9,381,921 B2 | 7/2016 | Renault et al. | |
| 9,382,833 B2 | 7/2016 | Morein | |
| 9,383,032 B1 | 7/2016 | Bhatasana | |
| 9,404,594 B2 | 8/2016 | Morein | |
| 9,500,299 B2 * | 11/2016 | Morein | F16K 11/0876 |
| 9,958,082 B2 | 5/2018 | Yu et al. | |
| 9,964,329 B2 * | 5/2018 | Whitmore | F24D 19/1024 |
| 10,344,877 B2 | 7/2019 | Roche et al. | |
| 10,458,562 B2 | 10/2019 | Ozeki et al. | |
| 10,544,725 B2 | 1/2020 | Schaefer | |
| 10,690,040 B2 | 6/2020 | Jang et al. | |
| 10,704,453 B2 | 7/2020 | Park et al. | |
| 10,808,856 B2 | 10/2020 | Shen et al. | |
| 10,927,972 B2 | 2/2021 | Murakami | |
| 10,968,809 B2 | 4/2021 | Yoshimura et al. | |
| 10,968,810 B2 | 4/2021 | Zhou et al. | |
| 2006/0237359 A1 | 10/2006 | Lin et al. | |
| 2007/0068587 A1 * | 3/2007 | Utterberg | F16K 27/041 |
| | | | 137/872 |
| 2010/0319796 A1 | 12/2010 | Whitaker | |
| 2013/0233424 A1 * | 9/2013 | Frey | F16K 11/22 |
| | | | 137/627 |
| 2015/0354716 A1 | 12/2015 | Morein | |
| 2017/0152957 A1 | 6/2017 | Roche et al. | |
| 2018/0119838 A1 * | 5/2018 | Brazas | F16K 31/535 |
| 2018/0259076 A1 * | 9/2018 | Feng | F24D 19/1024 |
| 2018/0292016 A1 | 10/2018 | Ledvora et al. | |
| 2019/0063625 A1 * | 2/2019 | Liberman | F16K 31/535 |
| 2019/0136724 A1 | 5/2019 | Wong | |
| 2020/0248836 A1 * | 8/2020 | Bugeja | F16K 31/535 |

FOREIGN PATENT DOCUMENTS

| | | |
|---|---|---|
| CN | 201502748 U | 6/2010 |
| CN | 201944338 U | 8/2011 |
| CN | 204729668 U | 10/2015 |
| CN | 105408671 A | 3/2016 |
| CN | 205401824 U | 7/2016 |
| CN | 107690543 A | 2/2018 |
| CN | 107917246 A1 | 4/2018 |
| CN | 108692066 A | 10/2018 |
| DE | 19707534 A1 | 5/1998 |
| EP | 0048680 A1 | 3/1982 |
| EP | 1448877 A1 | 8/2004 |
| EP | 2909514 A1 | 8/2015 |
| EP | 3385583 A1 | 10/2018 |
| FR | 2988459 A1 | 9/2013 |
| JP | H0246039 A | 2/1990 |
| JP | H0828725 A | 2/1996 |
| WO | 03046342 A1 | 6/2003 |
| WO | 2014052571 A1 | 4/2014 |
| WO | 2015004497 A1 | 1/2015 |

OTHER PUBLICATIONS

Chinese Office Action dated Jun. 3, 2021 for corresponding Chinese Patent Application No. 201810972429.5.

* cited by examiner

COOLANT FLOW CONTROL MODULE

CROSS-REFERENCE TO RELATED APPLICATIONS

This application claims the benefit of provisional application 62/961,961 filed Jan. 16, 2020, and provisional application 62/860,610, filed Jun. 12, 2019. The disclosure of the above application is incorporated herein by reference.

FIELD OF THE INVENTION

The invention relates generally to a coolant flow control module which includes several different individual valve modules that are assembled in one or more configurations to create multiple flow paths, where each of the valve modules are controlled by one or more actuators.

BACKGROUND OF THE INVENTION

Multi-port valves for directing fluid through various conduits are generally known. Some of the more common types of valve are a three-port valve and a four-port valve, where a single valve member is used to direct fluid from an inlet port to one of several outlet ports. However, with the advancement in electric vehicle technology, there is an increasing need for cooling of various electronic components, which many current valves are incapable of. Several current valve designs have limited configurations and capacities to providing sufficient cooling of these electronic components. Current valve designs are also expensive, complex, and costly to manufacture.

Accordingly, there exists a need for a valve assembly which has multiple configurations, has a simplified design and is able to be controlled by one or more actuators, and is able to direct flow from multiple inlet ports to multiple outlet ports, and is less complex and is less costly to manufacture.

SUMMARY OF THE INVENTION

In an embodiment, the present invention is a coolant flow control module having multiple valve modules, which includes a first outer housing, a first rotor located in the first outer housing, a second outer housing located adjacent the first outer housing, and a second rotor disposed in the second outer housing. The second rotor is engaged with the first rotor such that the first rotor and the second rotor rotate in unison and are able to be placed in one of a plurality of orientations. The coolant flow control module also includes an actuator connected to the first rotor, a first plurality of ports integrally formed as part of the first outer housing, and a second plurality of ports integrally formed as part of the second outer housing. The actuator rotates the first rotor and the second rotor to at least one of the plurality of orientations such that fluid is able to flow into or out of one or more of the first plurality of ports through the first rotor, and fluid is able to flow into or out of one or more of the second plurality of ports through the second rotor.

In an embodiment, the first rotor includes a first channel and a second channel. The first channel of the first rotor is fluidically isolated from the second channel of the first rotor, and the second channel of the first rotor is in fluid communication with two of the first plurality of ports when the first rotor is placed in at least one of the plurality of orientations. The first channel is in continuous fluid communication with the second rotor and the first channel is in fluid communication with one of the first plurality of ports when the first rotor is placed in at least one of the plurality of orientations.

In an embodiment, the first channel of the first rotor includes a tapered portion able to distribute fluid to, or receive fluid from, two of the first plurality of ports when the first rotor and the second rotor are placed in at least one of the plurality of orientations.

In an embodiment, the second rotor includes a first channel integrally formed as part of the second rotor, and a second channel integrally formed as part of the second rotor, such that the first channel of the second rotor is fluidically isolated from the second channel of the second rotor. The second channel of the second rotor is in fluid communication with two of the second plurality of ports when the second rotor is placed in at least one of the plurality of orientations.

The first channel of the first rotor is in continuous fluid communication with the first channel of the second rotor, such that when the first rotor and the second rotor are placed in at least one of the plurality of orientations, one of the first plurality of ports is in fluid communication with one of the second plurality of ports.

In an embodiment, a lower cylindrical wall is formed as part of the first rotor, and a lower notch is integrally formed as part of the lower cylindrical wall of the first rotor. An inner cylindrical wall is formed as part of the second rotor, and an exterior tab is integrally formed as part of the inner cylindrical wall of the second rotor. The lower cylindrical wall formed as part of the first rotor is in contact with the inner cylindrical wall formed as part of the second rotor, and the exterior tab is engaged with the lower notch such that the first rotor and the second rotor rotate in unison.

In an embodiment, the cylindrical wall of the second rotor is part of the first channel of the second rotor, and a portion of the cylindrical wall of second rotor extends into the first channel of the first rotor such that the first rotor is in fluid communication with the second rotor.

In an embodiment, a first coupling selectively connects the first rotor and the second rotor, and the actuator changes the position of the first rotor relative to the second rotor when the coupling disconnects the first rotor and the second rotor, and the first rotor is rotated.

In an embodiment, a third outer housing is located adjacent the second outer housing, a third plurality of ports integrally formed as part of the third outer housing, a third rotor is located in the third outer housing and engaged with the second rotor, and at least one channel is integrally formed as part of the third rotor. A side housing connected to the third outer housing, and an outer port integrally formed as part of the side housing. The channel of the third rotor is in continuous fluid communication with the outer port, such that when the first rotor, the second rotor, and the third rotor are placed in at least one of the plurality of orientations, at least one of the third plurality of ports is in fluid communication with the outer port.

In an embodiment, the channel of the third rotor includes a tapered portion able to distribute fluid to, or receive fluid from, two of the third plurality of ports integrally formed as part of the third outer housing when the first rotor, the second rotor, and the third rotor are placed in one of the plurality of orientations.

In an embodiment, a cylindrical wall is integrally formed as part of the second rotor, and an outer tab is integrally formed as part of the cylindrical wall of the second rotor. An upper cylindrical wall is formed as part of the third rotor, and an upper notch is integrally formed as part of the upper cylindrical wall of the third rotor. The cylindrical wall formed as part of the second rotor is in contact with the upper cylindrical wall formed as part of the third rotor, and the outer tab is engaged with the upper notch, such that the second rotor and the third rotor rotate in unison.

In an embodiment, a second coupling selectively connects the second rotor to the third rotor, and the actuator changes the position of the second rotor relative to the third rotor when the coupling disconnects the second rotor and the third rotor, and the second rotor is rotated.

In one embodiment, the present invention is a valve assembly having multiple valve modules. In an embodiment, the valve assembly includes a plurality of valve modules, a plurality of shafts, each one of the plurality of shafts being part of a corresponding one of the plurality of valve modules, and an actuator connected to one of the plurality of shafts. Also included is a plurality of couplings, each one of the plurality of couplings operable for selectively coupling two of the plurality of shafts. The actuator rotates a first of the plurality of shafts to configure a first of the valve modules to provide one or more flow paths, and when one or more of the plurality of couplings connect two or more of the shafts, one or more of the plurality of valve modules are configured to provide multiple flow paths.

In an embodiment, each of the valve modules includes a housing, a plurality of ports, each of the plurality of ports formed as part of the housing, and a rotor disposed in the housing, where the rotor is selectively in fluid communication with the plurality of ports. At least two flow paths formed by the orientation of the rotor relative to the housing and the ports, and the rotor is placed in one of a plurality of orientations relative to the ports and the housing such that each of the orientations includes the at least two flow paths.

In an embodiment each rotor includes a first channel integrally formed as part of the rotor, and a second channel integrally formed as part of the rotor, where the second channel is fluidically isolated from the first channel. An axis extends through the rotor, and the rotor is rotatable about the axis. At least a portion of one of the first channel or the second channel extends along the axis.

In an embodiment, each valve module includes a worm connected to one of the plurality of shafts, and a worm gear connected to the rotor. The worm gear is in mesh with the worm such that the worm gear and the rotor are rotated as the worm is rotated by one of the plurality of shafts. In an embodiment, the worm gear circumscribes one of the first channel or the second channel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
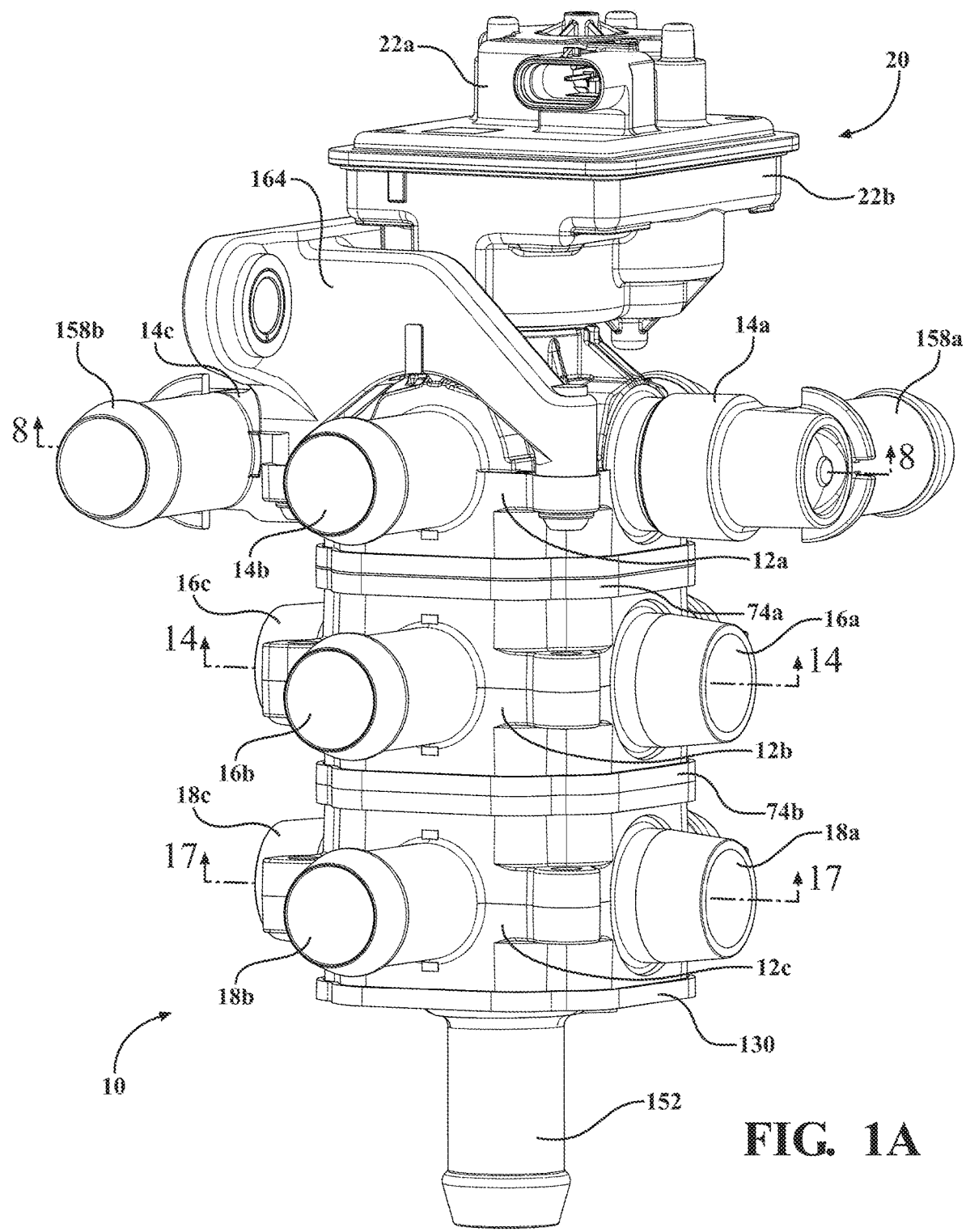
FIG. 1A is a first perspective view of a coolant flow control module, according to embodiments of the present invention.
Figure 1B:
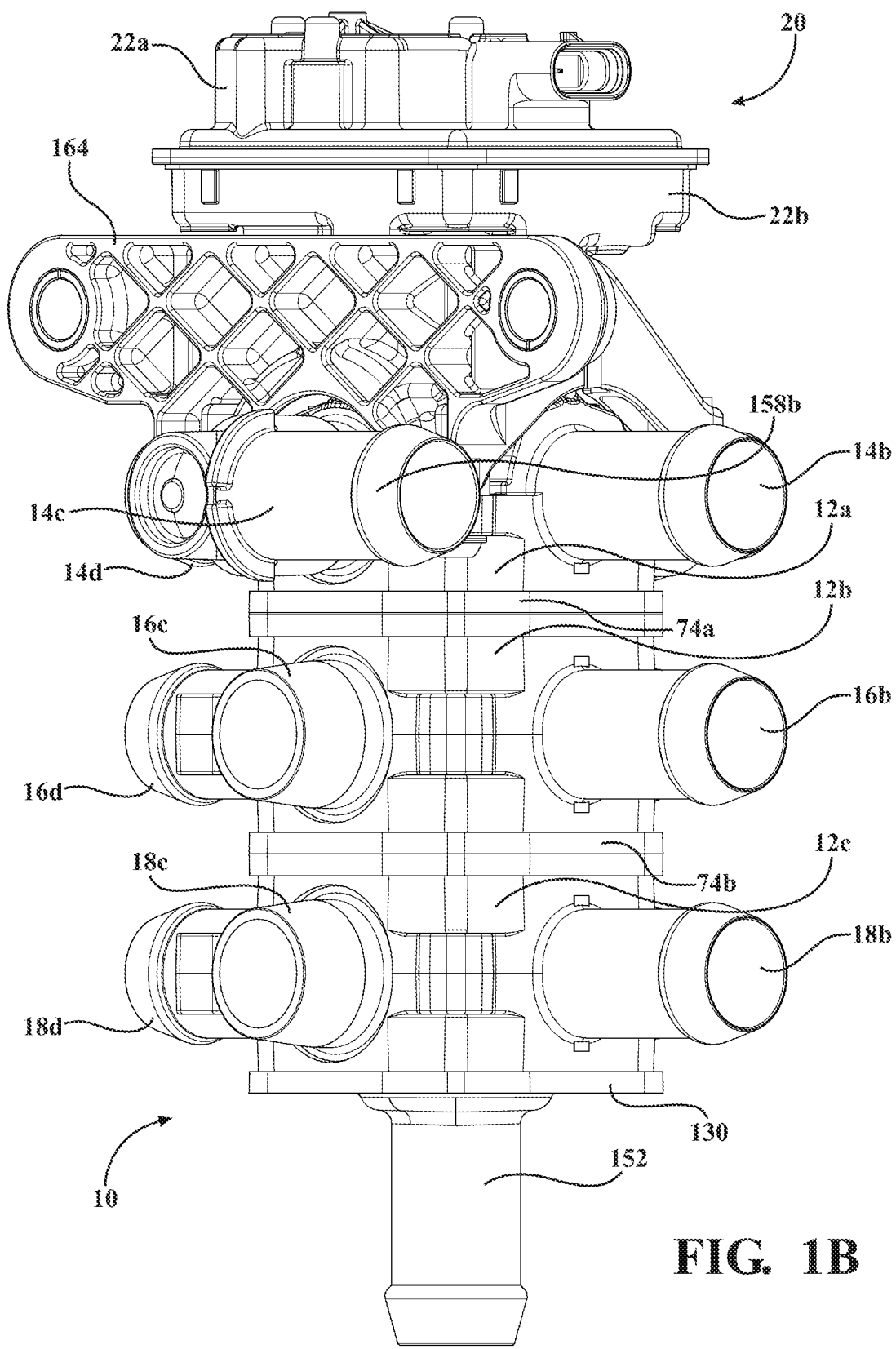
FIG. 1B is a second perspective view of a coolant flow control module, according to embodiments of the present invention.

A coolant flow control module is shown generally in FIGS. 1A and 1B generally at 10. The module 10 includes a first outer housing 12a, a second outer housing 12b, and a third outer housing 12c. Integrally formed with the first outer housing 12a is a first plurality of ports 14a, 14b, 14c, 14d. Integrally formed with the second outer housing 12b is a second plurality of ports 16a, 16b, 16c, 16d. Integrally formed with the third outer housing 12c is a third plurality of ports 18a, 18b, 18c, 18d.

Figure 2A:
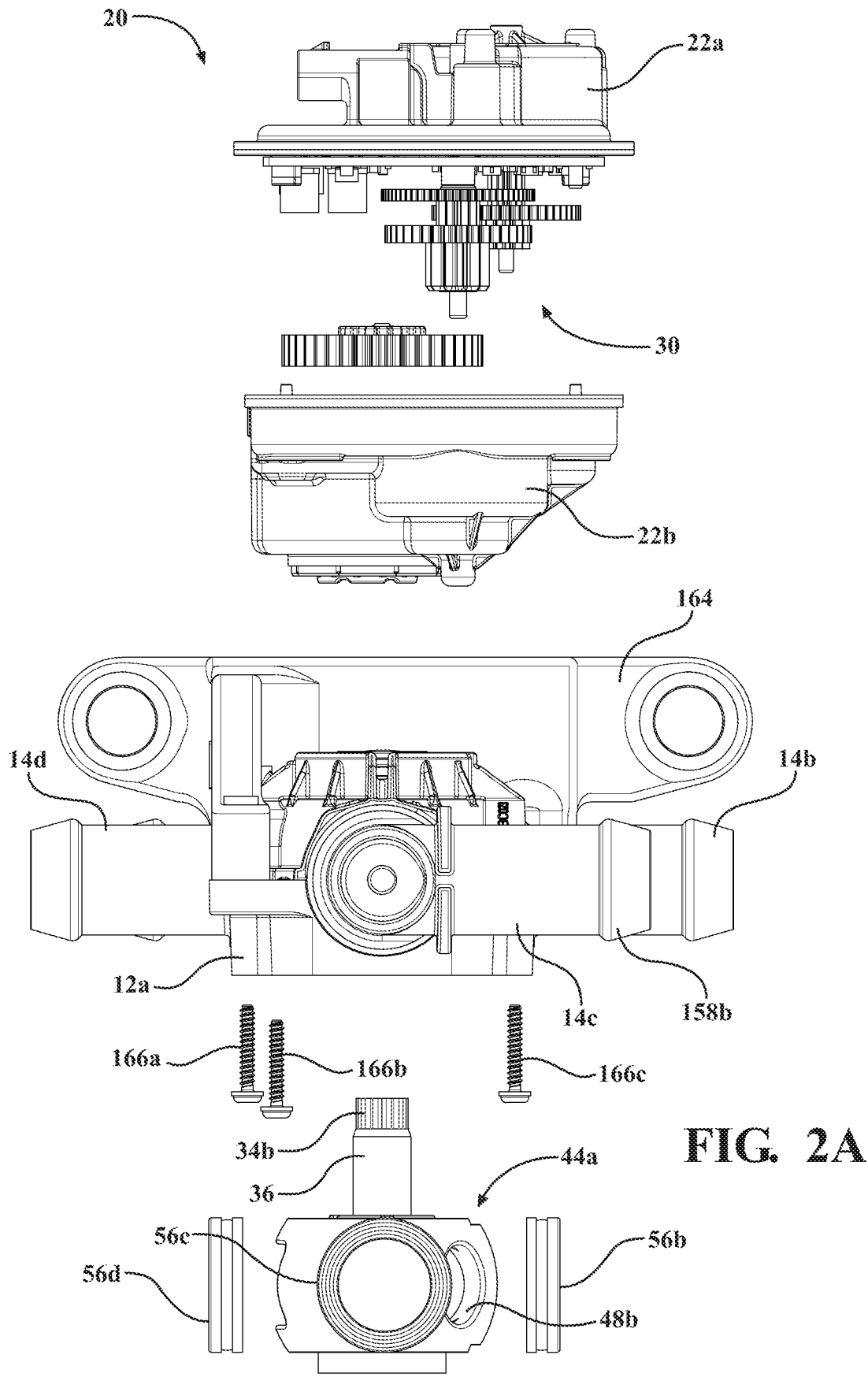
FIG. 2A is a first partial exploded view of several components which are part of a coolant flow control module, according to embodiments of the present invention.
Figure 2B:
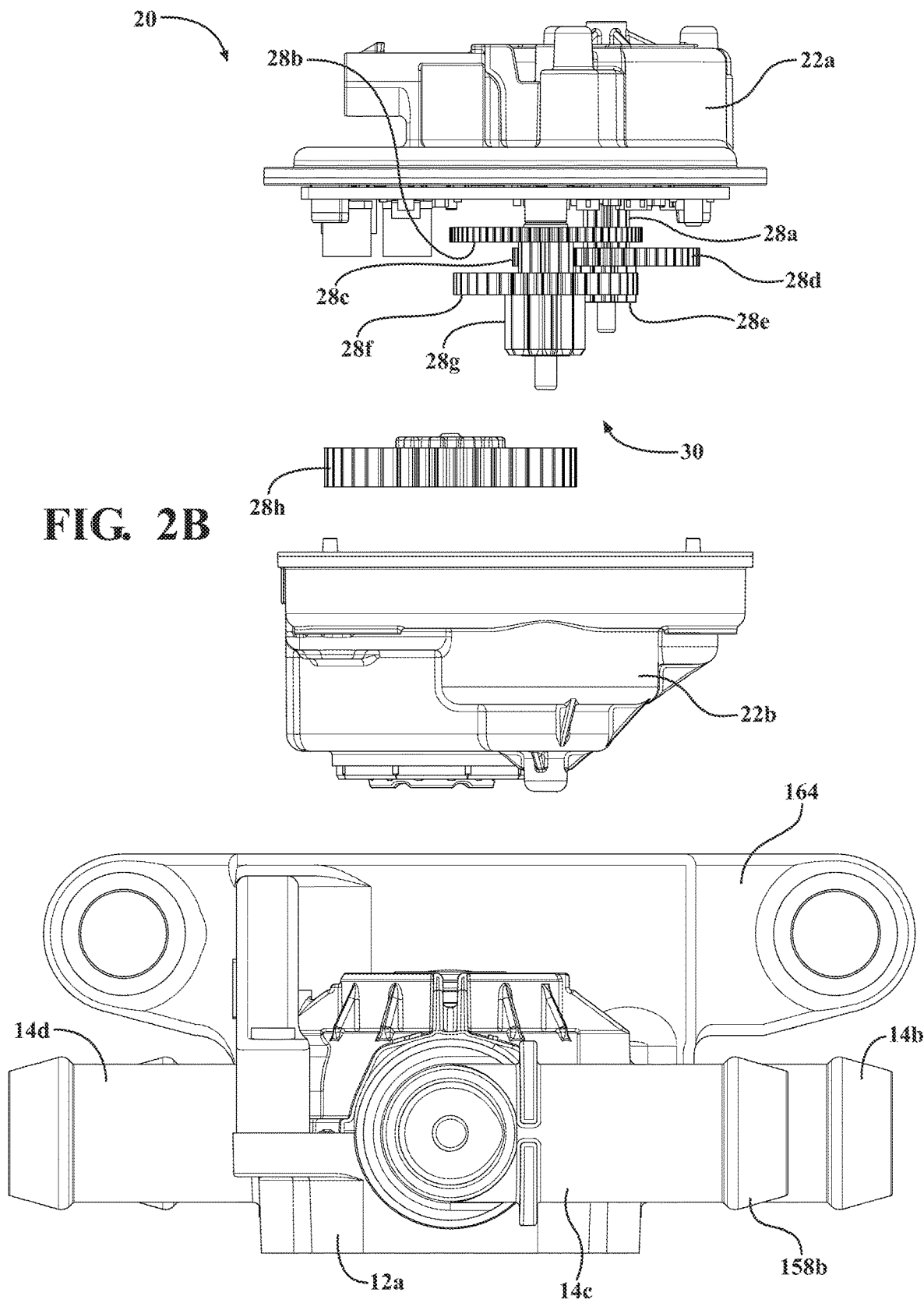
FIG. 2B is a second partial exploded view of several components which are part of a coolant flow control module, according to embodiments of the present invention.
Figure 3:
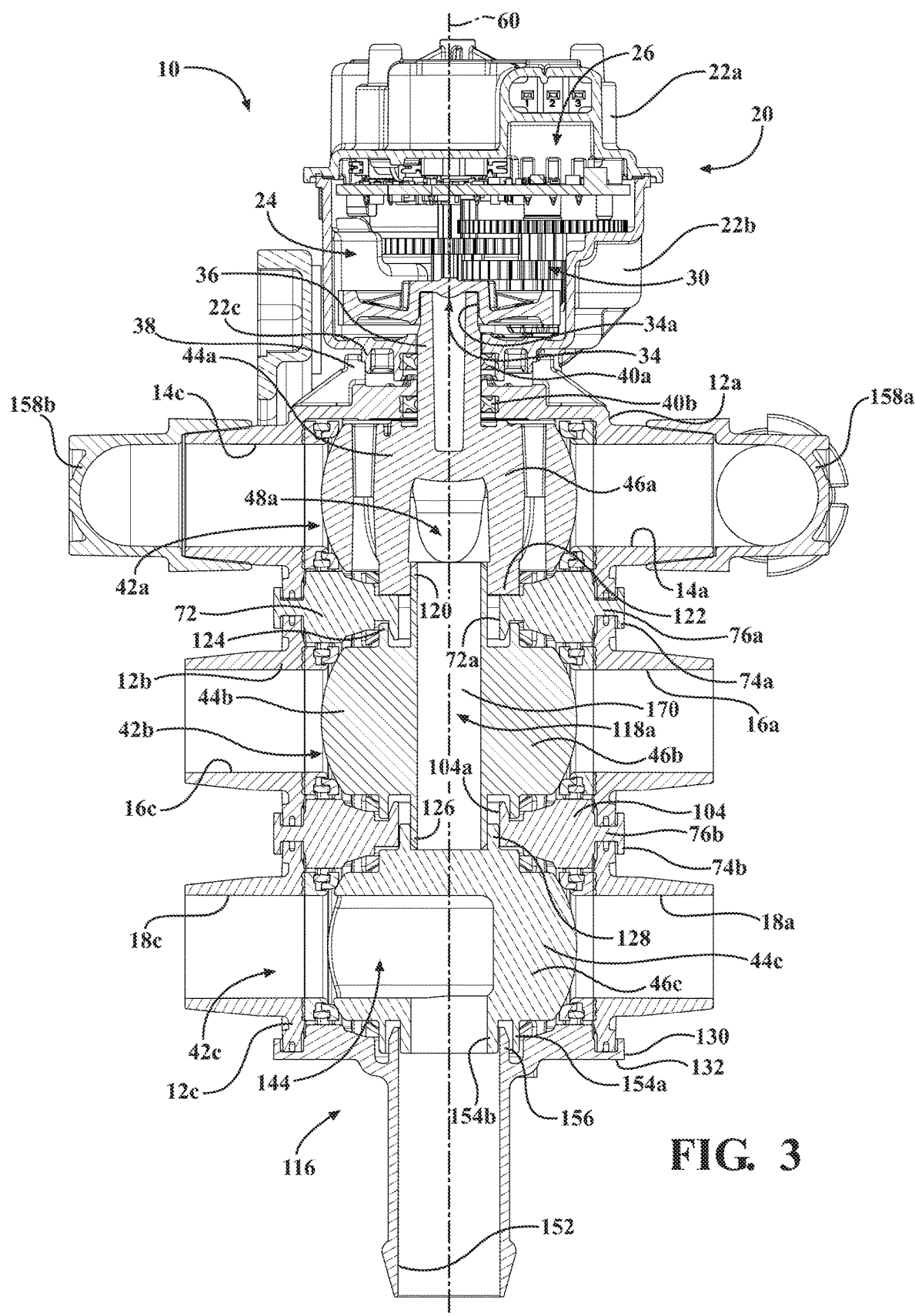
FIG. 3 is a sectional view of a coolant flow control module, according to embodiments of the present invention.

Connected to the first outer housing 12a is an actuator assembly, shown generally at 20. The actuator assembly 20 includes an actuator housing having two parts 22a, 22b. When assembled, the two parts 22a, 22b form a cavity, shown generally at 24 in FIG. 3. Disposed in the cavity 24 is an actuator, which in this embodiment is an electric motor 26 having a pinion gear 28a, which is part of a gearset, shown generally at 30, used for transferring power from the electric motor 26 to a first rotor, shown generally at 44a in FIGS. 2A, 3-6, and 8-9B. Referring to FIGS. 2A, 2B, and 3, the pinion gear 28a is in mesh with a first drive gear 28b, and the first drive gear 28b is integrally formed with a second pinion gear 28c. The second pinion gear 28c is in mesh with a second drive gear 28d, and the second drive gear 28d is integrally formed with a third pinion gear 28e. The third pinion gear 28e is in mesh with a third drive gear 28f, and the third drive gear 28f is integrally formed with a fourth pinion gear 28g. The fourth pinion gear 28g is in mesh with a sector gear 28h. The sector gear 28h includes a cavity 34 with an internal spline portion 34a, where the internal spline portion 34a is engaged with an external spline portion 34b formed as part of a shaft 36 of the first rotor 44a, such that the sector gear 28h and the first rotor 44a rotate in unison.

The second part 22b of the actuator housing includes a flange portion 22c which is connected to a flange portion 38 formed as part of the first outer housing 12a through some type of connection, such as welding, or more specifically ultrasonic welding. There are also two shaft seals 40a, 40b; one seal 40a is disposed adjacent to the second part 22b of the actuator housing, and the other seal 40b is disposed in the first outer housing 12a. Both shaft seals 40a,40b prevent fluid from flowing into the actuator housing from the first outer housing 12a.

The first outer housing 12a includes a cavity, shown generally at 42a. The first rotor 44a is disposed in the cavity 42a, and the shaft 36 of the first rotor 44a extends out of the first outer housing 12a and into the actuator housing. The shaft 36 is integrally formed with a body portion 46a of the first rotor 44a. Referring again to FIGS. 8-9B, the first rotor 44a has multiple channels which provide multiple flow paths through the rotor 44a. In this embodiment, the first rotor 44a includes a first channel 48a and a second channel 48b. The first channel 48a is shaped at a 90° angle, but it is within the scope of the invention that the first channel 48a may be formed at other angles as well. The first channel 48a extends from the bottom of the first rotor 44a to the side of the first rotor 44a. The first channel 48a also includes a tapered portion 50, such that fluid is able to be dispersed from the tapered portion 50 of first rotor 44a to multiple ports. Conversely, fluid is also able to flow into the first rotor 44a through tapered portion 50 from multiple ports. The tapered portion 50 is formed to have an angle 52, more specifically, there are sidewalls 54a,54b which are positioned at the angle 52 relative to one another, shown in FIGS. 9A and 9B. The angle 52 of the sidewalls 54a,54b may be different in various embodiments to change the fluid flow to or from the ports 14a,14b,14c,14d.

Figure 7:
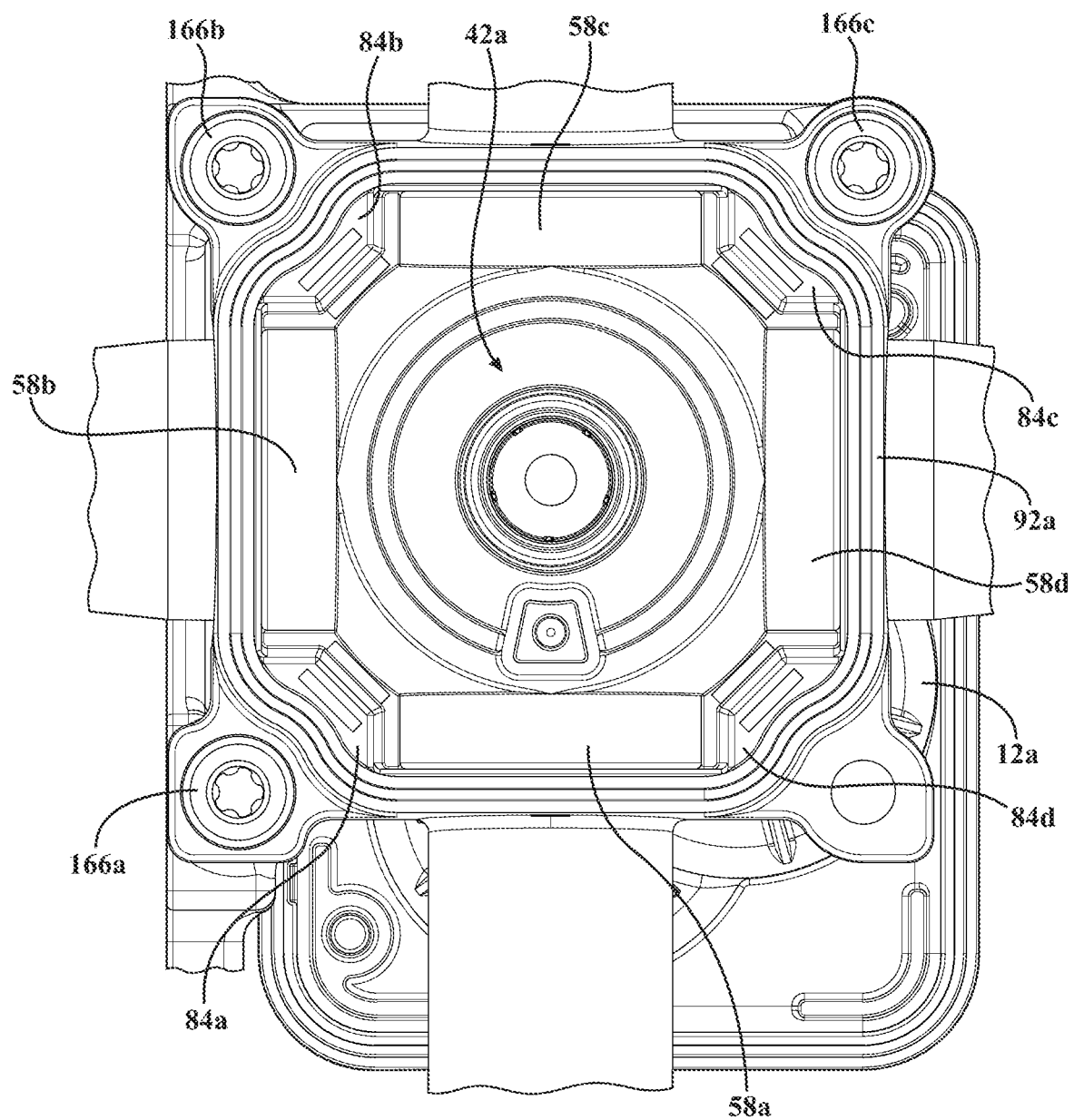
FIG. 7 is a bottom view of part of a first outer housing which is part of a coolant flow control module, according to embodiments of the present invention.

Referring to FIGS. 4-6 and 10, also disposed in the cavity 42a of the first outer housing 12a is a first plurality of seals 56a,56b,56c,56d which are in sliding contact with the outer surface of the first rotor 44a. Integrally formed as part of the first outer housing 12a is a plurality of semicircular recesses 58a,58b,58c,58d. Each of the seals 56a,56b,56c,56d is partially disposed in and supported by a corresponding one of the semicircular recesses 58a,58b,58c,58d in the cavity 42a of the first outer housing 12a, shown in FIGS. 3, 5, and 7.

Figure 4:
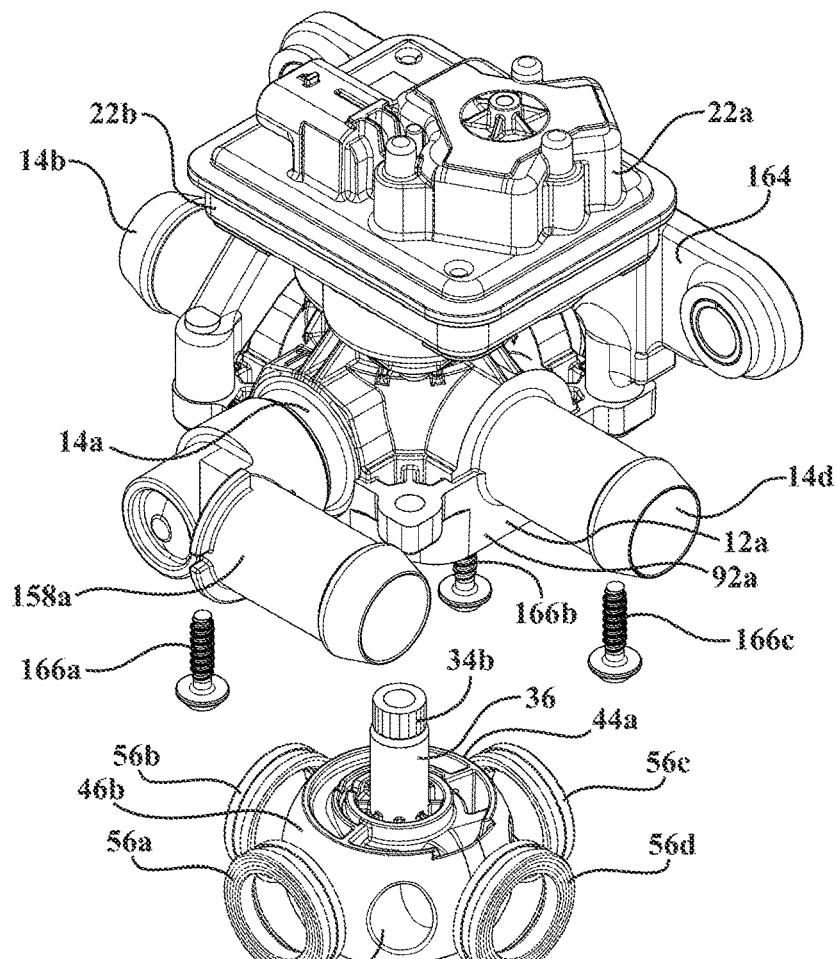
FIG. 4 is a third partial exploded view of several components which are part of a coolant flow control module, according to embodiments of the present invention.
Figure 4:
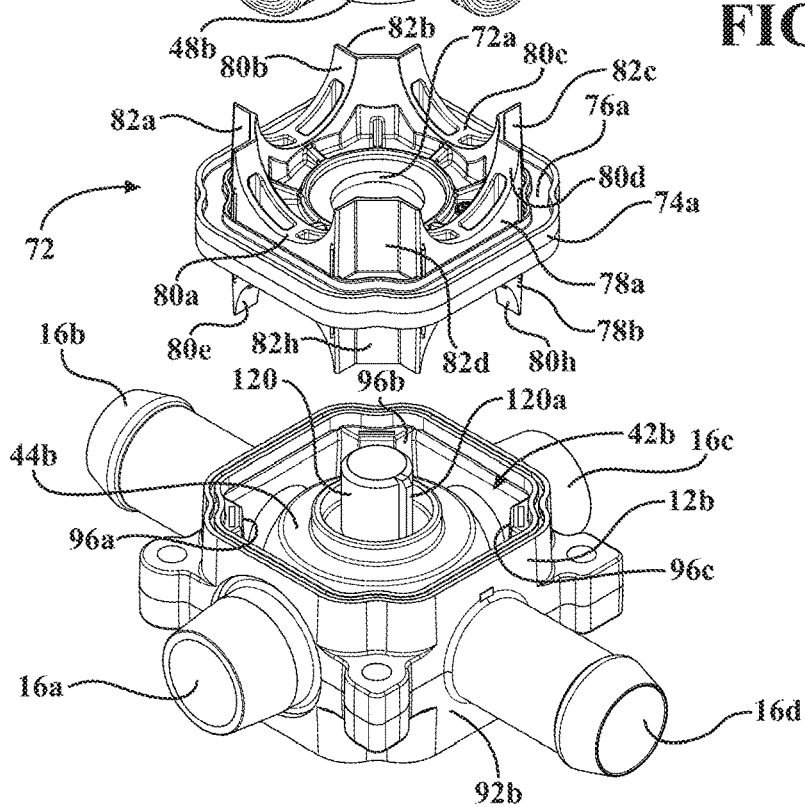
Figure 5:
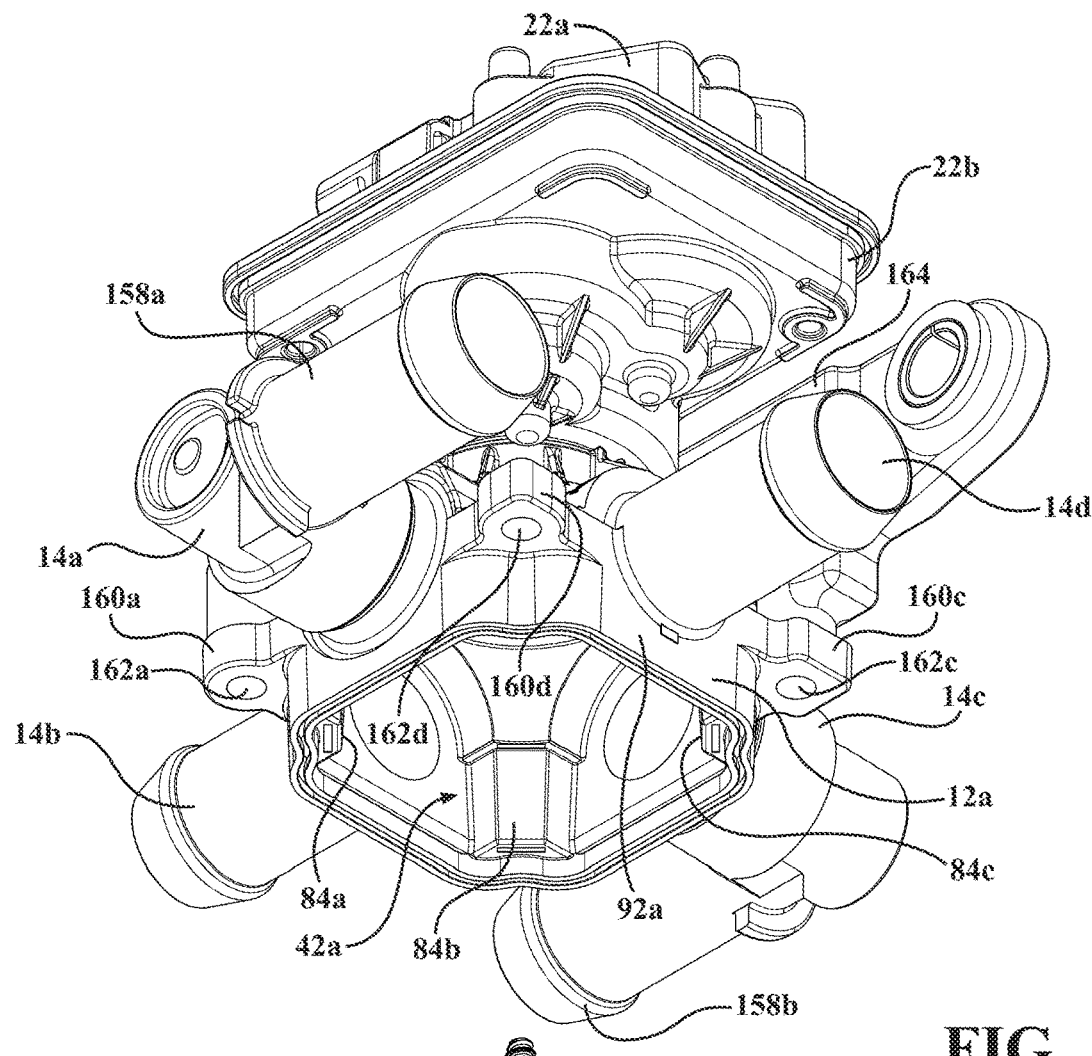
FIG. 5 is a fourth partial exploded view of several components which are part of a coolant flow control module, according to embodiments of the present invention.
Figure 5:
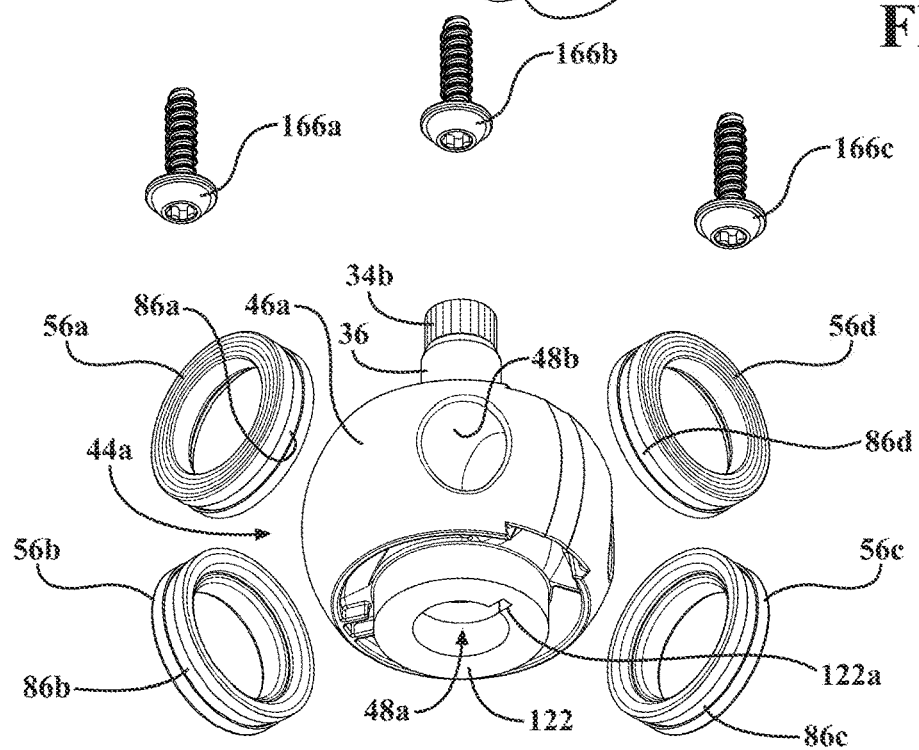
Figure 6:
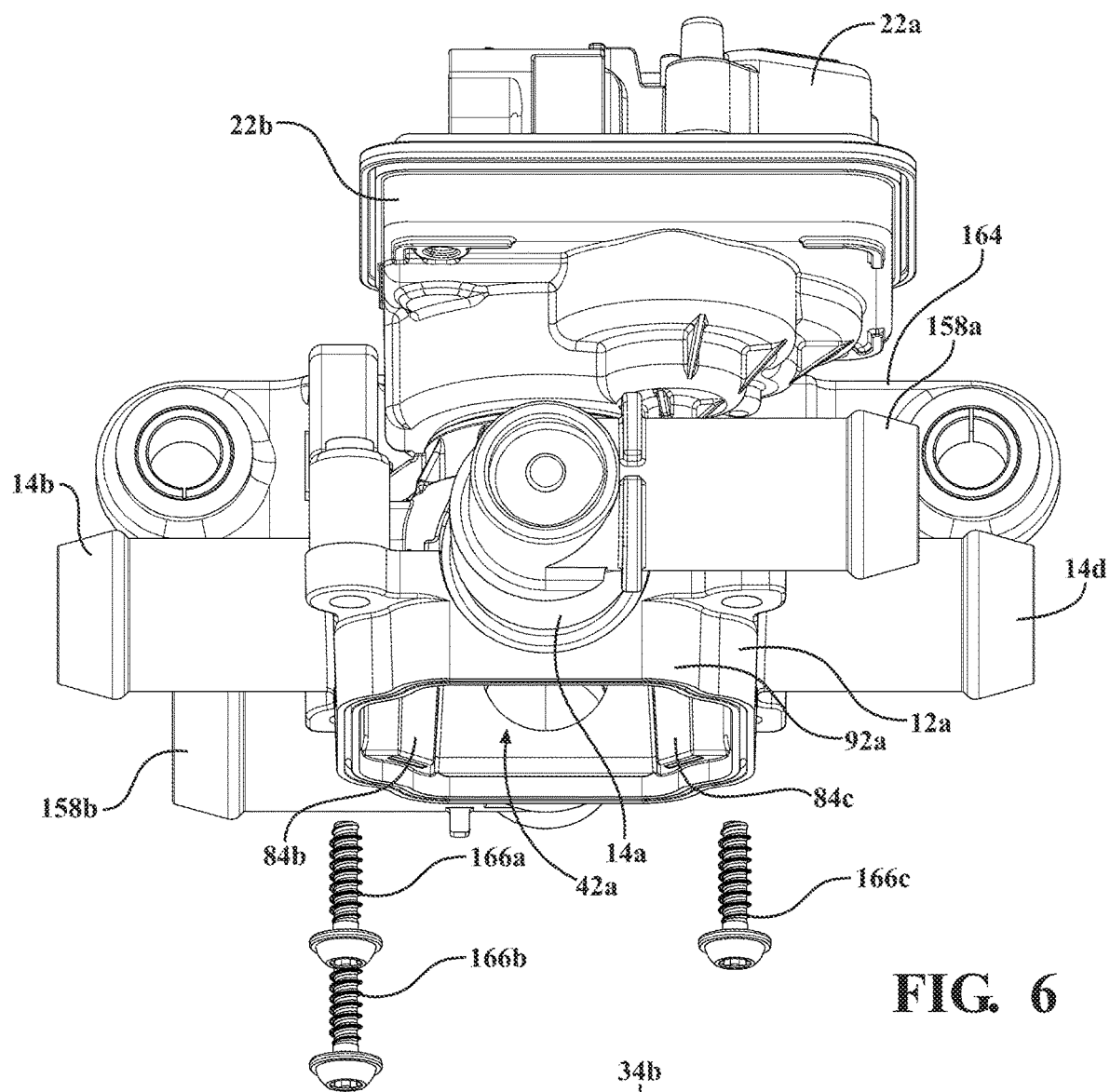
FIG. 6 is a fifth partial exploded view of several components which are part of a coolant flow control module, according to embodiments of the present invention.
Figure 6:
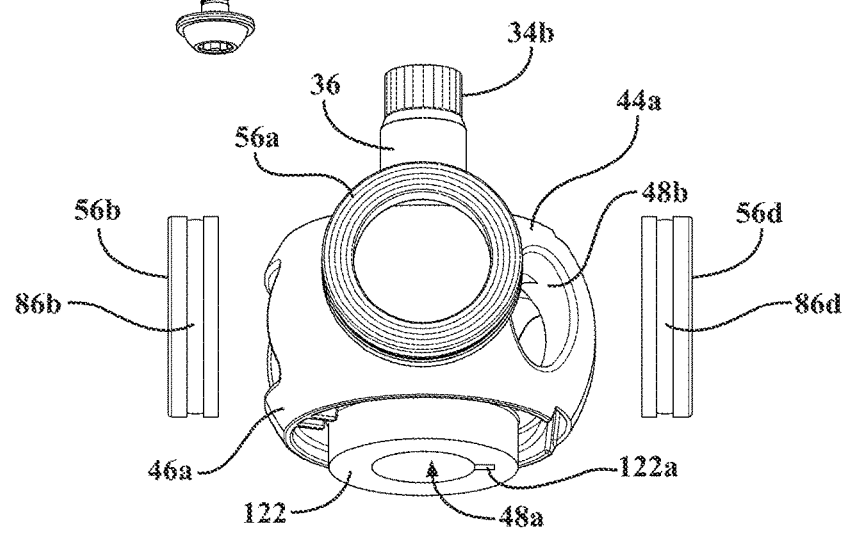
Figure 10:
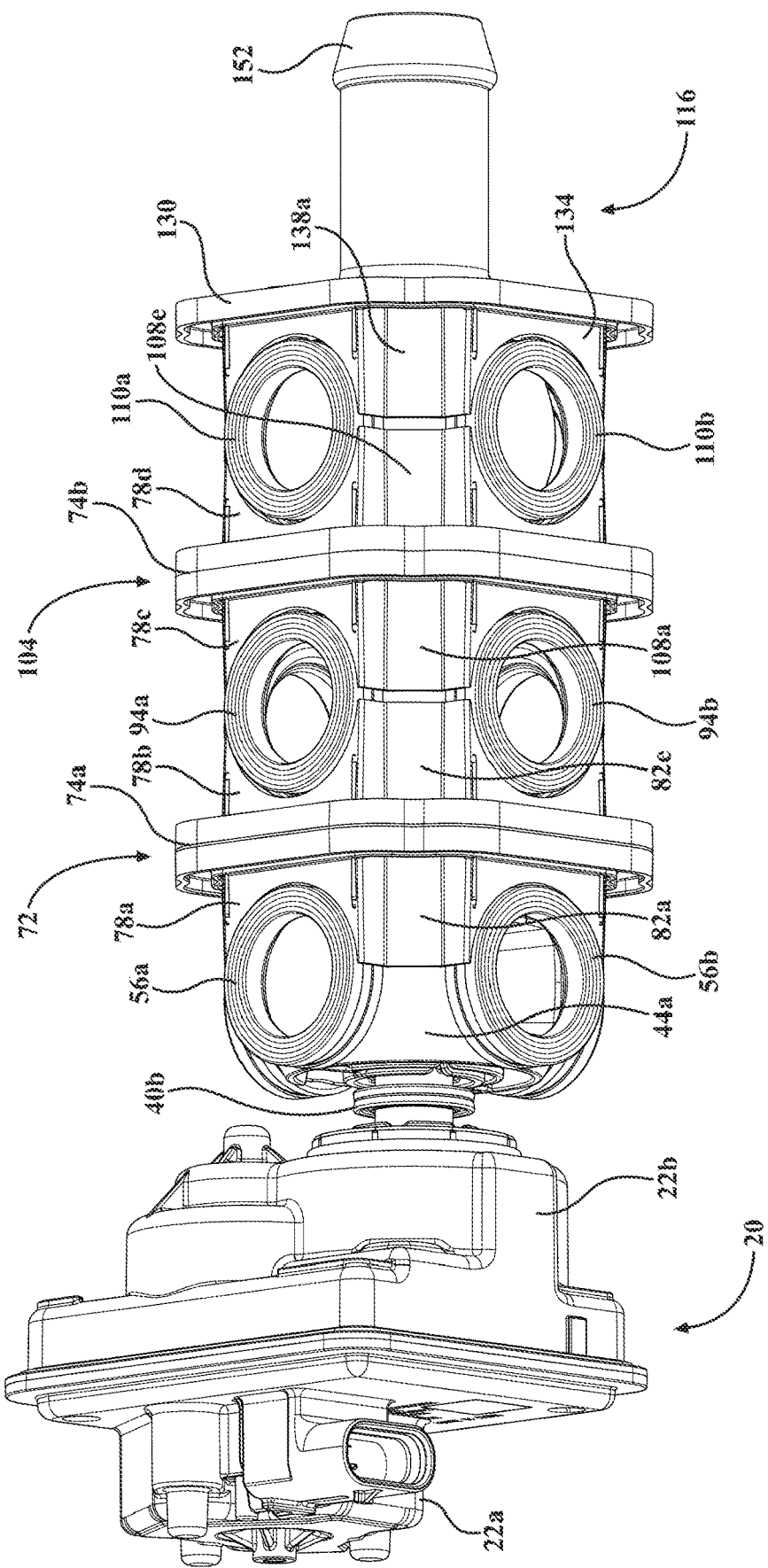
FIG. 10 is a perspective view of a coolant flow control module, with the first outer housing, the second outer housing, and the third outer housing removed, according to embodiments of the present invention.
Figure 11:
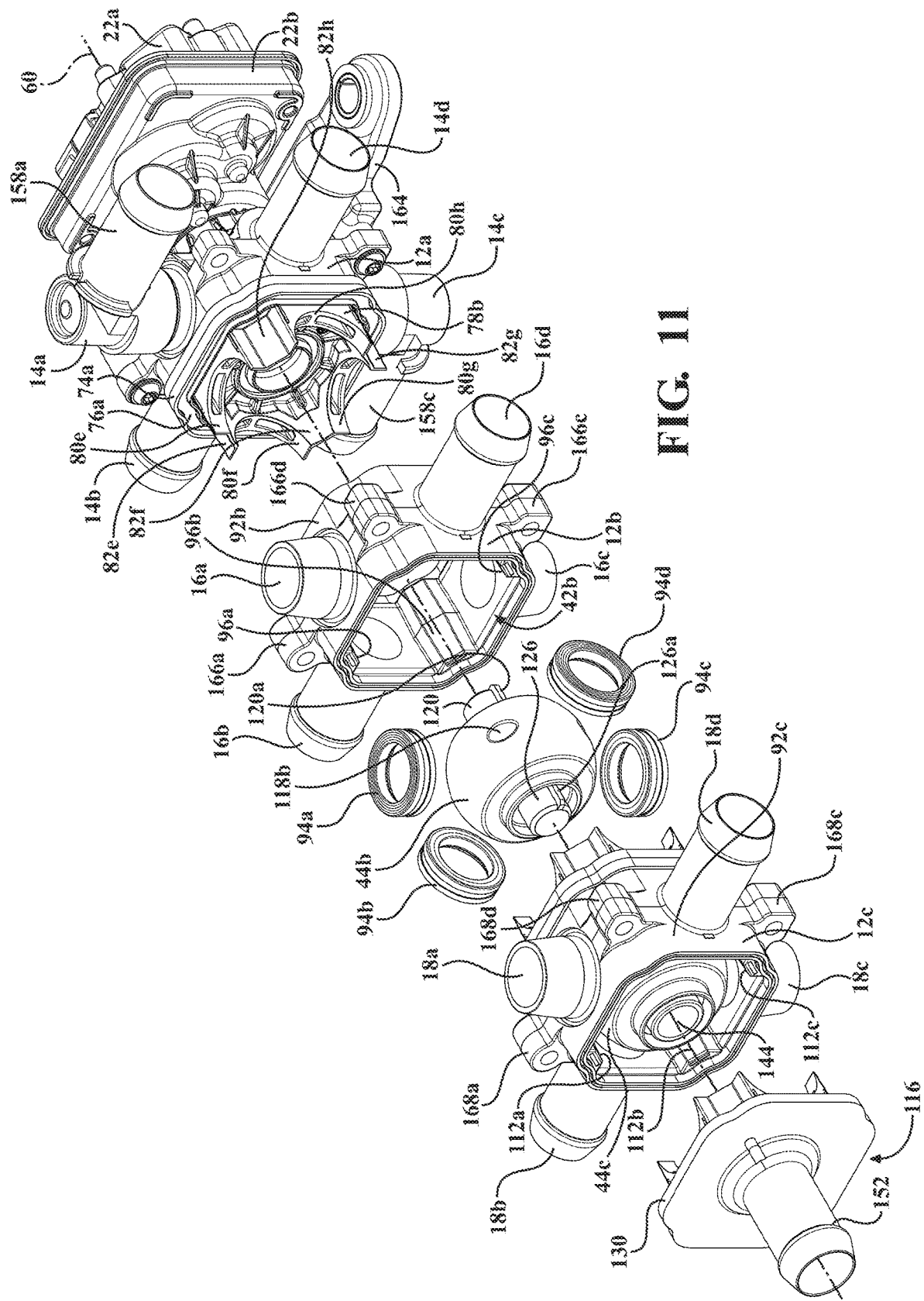
FIG. 11 is a sixth partial exploded view of several components which are part of a coolant flow control module, according to embodiments of the present invention.
Figure 12:
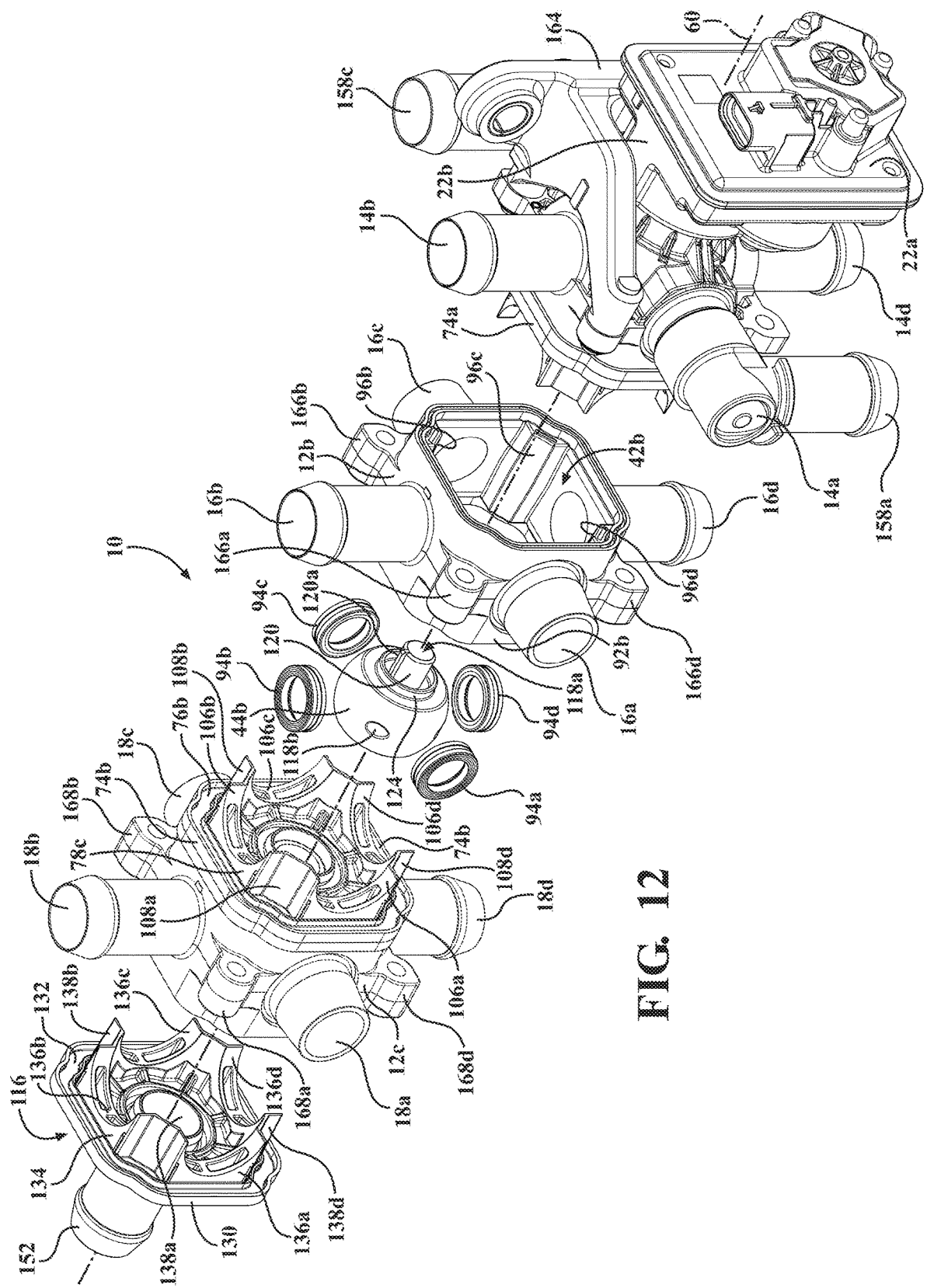
FIG. 12 is a seventh partial exploded view of several components which are part of a coolant flow control module, according to embodiments of the present invention.
Figure 13A:
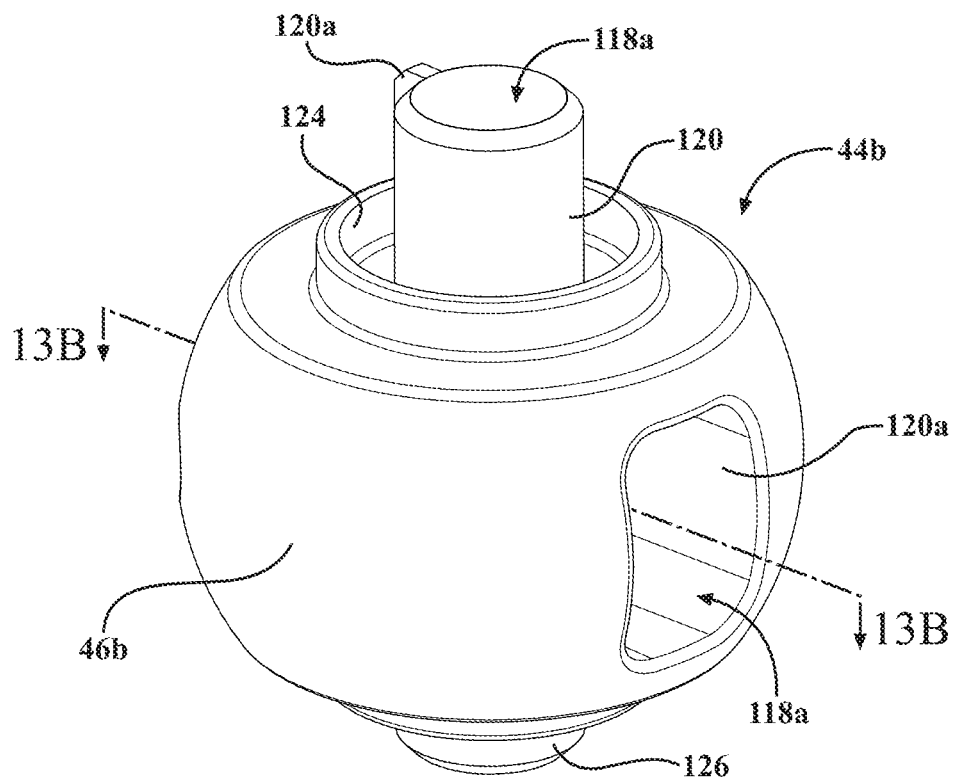
FIG. 13A is a perspective view of a second rotor used as part of a coolant flow control module, according to embodiments of the present invention.
Figure 13B:
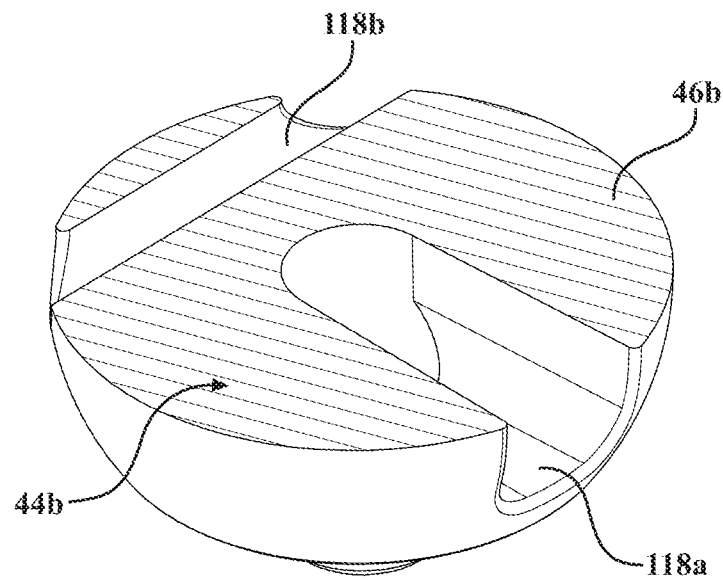
FIG. 13B is a sectional view taken along lines 13B-13B in FIG. 13A.

Partially disposed in the cavity 42a of the first outer housing 12a is a first intermediate inner housing, shown generally at 72 in FIGS. 3-4 and 10. The first intermediate inner housing 72 has an outer lip portion 74a attached to a wall portion 76a. Integrally formed with the wall portion 76a is a circumferential wall 78a having a first plurality of semicircular recesses 80a,80b,80c,80d, where the circumferential wall 78a is located in the cavity 42a when the coolant flow control module 10 is assembled. Each of the seals 56a,56b,56c,56d is partially disposed in and supported by a corresponding one of the semicircular recesses 80a, 80b,80c,80d of the circumferential wall 78a. The seals 56a,56b,56c,56d are therefore supported by the semicircular recesses 58a,58b,58c,58d of the first outer housing 12a and the semicircular recesses 80a,80b,80c,80d of the circumferential wall 78a. The circumferential wall 78a also has four keyways 82a,82b,82c,82d which are engaged with four correspondingly shaped protrusions 84a,84b,84c,84d formed as part of the first outer housing 12a which help to ensure proper alignment between the first outer housing 12a and the first intermediate inner housing 72 during assembly. Each of the seals 56a,56b,56c,56d is a three-piece seal, and includes a groove 86a,86b,86c,86d. However, it is within the scope of the invention that the seals 56a,56b,56c,56d may be of unitary construction, and may be formed in different shapes, while still providing the desired functionality.

When the first intermediate inner housing 72 is connected to the first outer housing 12a, part of the outer lip portion 74a circumscribes part of a sidewall 92a of the first outer housing 12a, and the sidewall 92a contacts the wall portion 76a, providing a seal between the first intermediate inner housing 72 and the first outer housing 12a. In one embodiment, the sidewall 92a is welded to the wall portion 76a, but it is within the scope of the invention that other types of connections may be used, such as an adhesive, or other types of welding. In an embodiment, an O-ring or other type of seal may be disposed between the sidewall 92a and the wall portion 76a.

The first intermediate inner housing 72 is also partially disposed in a cavity, shown generally at 42b, of the second outer housing 12b. The second outer housing 12b also has a sidewall 92b. When the first intermediate housing 72 is connected to the second outer housing 12b, part of the outer lip portion 74a circumscribes part of the sidewall 92b of the second outer housing 12b, and the sidewall 92b contacts the wall portion 76a on the opposite side of the wall portion 76a as the sidewall 92a. The sidewall 92b contacts the wall portion 76a, providing a seal between the first intermediate housing 72 and the second outer housing 12a. In one embodiment, the sidewall 92b is welded to the wall portion 76a, but it is within the scope of the invention that other types of connections may be used, such as an adhesive, or other types of welding. In an embodiment, an O-ring or other type of seal may be disposed between the sidewall 92b and the wall portion 76a.

Referring to FIGS. 3-4 and 10-12, the first intermediate housing 72 also includes another circumferential wall 78b having a second plurality of semicircular recesses 80e,80f, 80g,80h, where the circumferential wall 78b is located in the cavity 42b when the coolant flow control module 10 is assembled. A second plurality of seals 94a,94b,94c,94d is also located in the cavity 42b of the second outer housing 12b, and each of the seals 94a,94b,94c,94d is partially disposed in and supported by a corresponding one of the semicircular recesses 80e,80f,80g,80h of the circumferential wall 78b. Both circumferential walls 78a,78b are shaped in a similar manner. The circumferential wall 78b also has four keyways 82e,82f,82g,82h which are engaged with four correspondingly shaped protrusions 96a,96b,96c,96d formed as part of the second outer housing 12b which help to ensure proper alignment between the second outer housing 12b and the first intermediate inner housing 72 during assembly. Each of the seals 94a,94b,94c,94d includes a groove and is shaped similar to the seals 56a,56b,56c,56d and is of similar construction.

Referring to FIGS. 3 and 10-15B, also partially disposed in the cavity 42b of the second outer housing 12b is a second intermediate inner housing 104. The second intermediate inner housing 104 is of the same shape and construction as the first intermediate inner housing 72. The second intermediate inner housing 104 includes an outer lip portion 74b attached to a wall portion 76b. Integrally formed with the wall portion 76b is a circumferential wall 78c having a first plurality of semicircular recesses 106a,106b,106c,106d, where the circumferential wall 78c is located in the cavity 42b when the coolant flow control module 10 is assembled. Each of the seals 94a,94b,94c,94d is partially disposed in and supported by a corresponding one of the semicircular recesses 106a,106b,106c,106d of the circumferential wall 78c. The seals 94a,94b,94c,94d are therefore supported by the semicircular recesses 80e,80f,80g,80h of the circumferential wall 78b and the semicircular recesses 106a,106b, 106c,106d of the circumferential wall 78c. The circumferential wall 78c also has four keyways 108a,108b,108c,108d which are engaged with the four correspondingly shaped protrusions 96a,96b,96c,96d formed as part of the second outer housing 12b which help to ensure proper alignment between the second outer housing 12b and the first intermediate inner housing 104 during assembly.

When the second intermediate inner housing 104 is connected to the second outer housing 12b, part of the outer lip portion 74b circumscribes part of a sidewall 92b of the second outer housing 12b, and the sidewall 92b contacts the wall portion 76b, providing a seal between the second intermediate inner housing 104 and the second outer housing 12b. In one embodiment, the sidewall 92b is welded to the wall portion 76b, but it is within the scope of the invention that other types of connections may be used, such as an adhesive, or other types of welding. In an embodiment, an O-ring or other type of seal may be disposed between the sidewall 92b and the wall portion 76b.

Disposed in the cavity 42b of the second outer housing 12b is a second rotor 44b. The second rotor 44b also includes a body portion 46b, and the second rotor 44b is in sliding contact with the seals 94a,94b,94c,94d. The second rotor 44b includes a first channel 118a and a second channel 118b, which are fluidically isolated from one another. The first channel 118a is T-shaped, but it is within the scope of the invention that the first channel 118a may be formed at other angles as well. A first portion 170 of the first channel 118a extends along an axis 60, where the axis 60 extends through the entire coolant flow control module 10, and the rotors 44a,44b rotate about the axis 60. A portion of the first channel 118a extends through an inner cylindrical wall 120 formed as part of the second rotor 44b. A portion of the inner cylindrical wall 120 extends into the first channel 48a of the first rotor 44a, such that the first channel 118a of the second rotor 44b is in continuous fluid communication with the first channel 48a of the first rotor 44a. There is also an exterior tab 120a integrally formed as part of the inner cylindrical wall 120 which is engaged with a lower notch 122a integrally formed as part of a lower cylindrical wall 122, where the lower cylindrical wall 122 is integrally formed as part of the first rotor 44a. As shown in FIG. 3, the lower cylindrical wall 122 of the first rotor 44a is in contact with the inner cylindrical wall 120 of the second rotor 44b. There is also an outer cylindrical wall 124 integrally formed as part of the second rotor 44b, where the outer cylindrical wall 124 extends through and is in contact with an aperture 72a formed as part of the first intermediate inner housing 72 and also contacts the lower cylindrical wall 122.

Referring again to FIGS. 3 and 10-15B, the second intermediate inner housing 104 is also partially disposed in a cavity, shown generally at 42c, of the third outer housing 12c. The third outer housing 12c also has a sidewall 92c. When the second intermediate housing 104 is connected to the third outer housing 12c, part of the outer lip portion 74b circumscribes part of the sidewall 92c of the third outer housing 12c, and the sidewall 92c contacts the wall portion 76b on the opposite side of the wall portion 76b as the sidewall 92b. The sidewall 92c contacts the wall portion 76b, providing a seal between the second intermediate housing 104 and the third outer housing 12c. In one embodiment, the sidewall 92c is welded to the wall portion 76b, but it is within the scope of the invention that other types of connections may be used, such as an adhesive, or other types of welding. In an embodiment, an O-ring or other type of seal may be disposed between the sidewall 92c and the wall portion 76b.

Figure 15A:
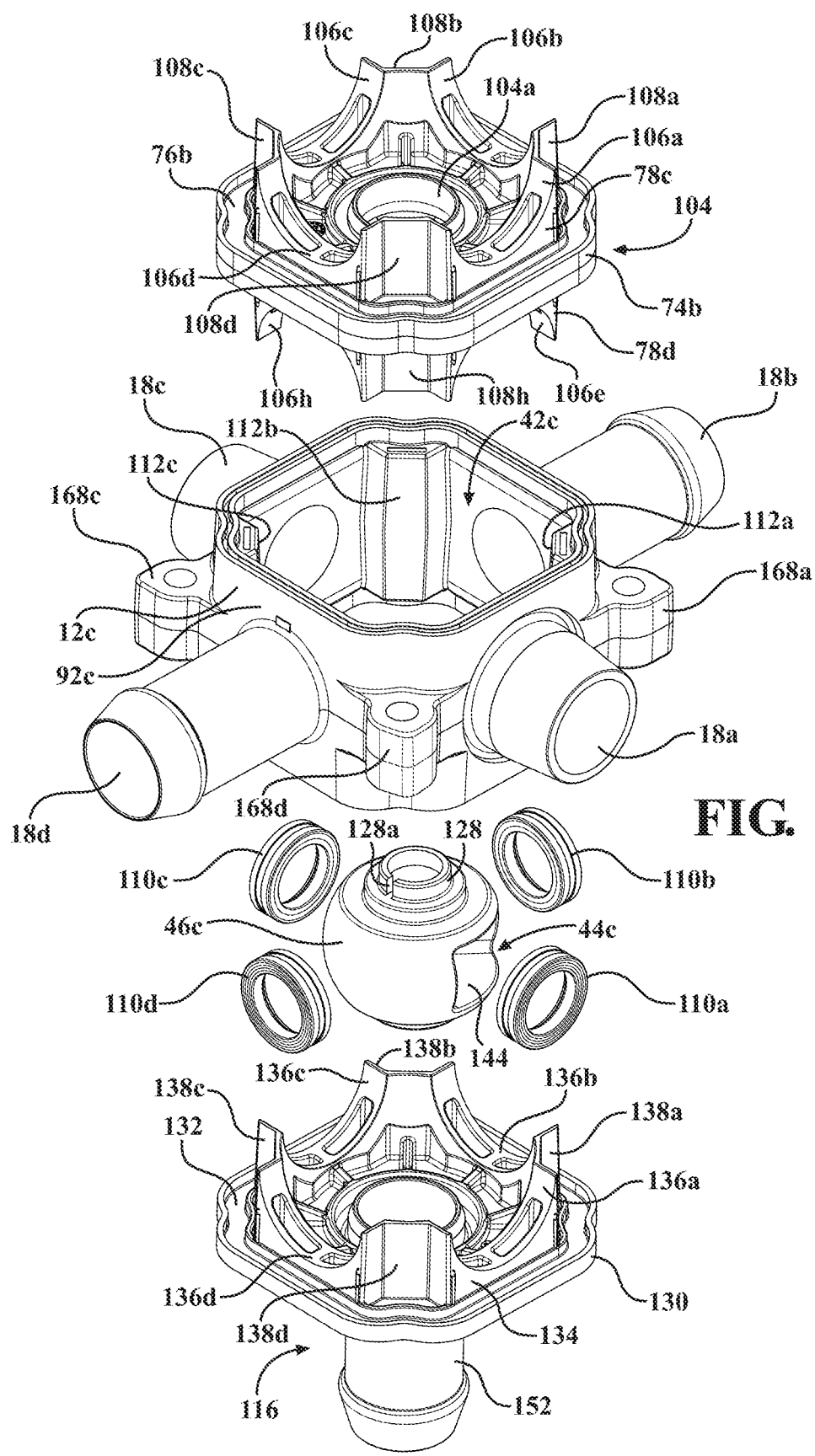
FIG. 15A is an eighth partial exploded view of several components which are part of a coolant flow control module, according to embodiments of the present invention.
Figure 15B:
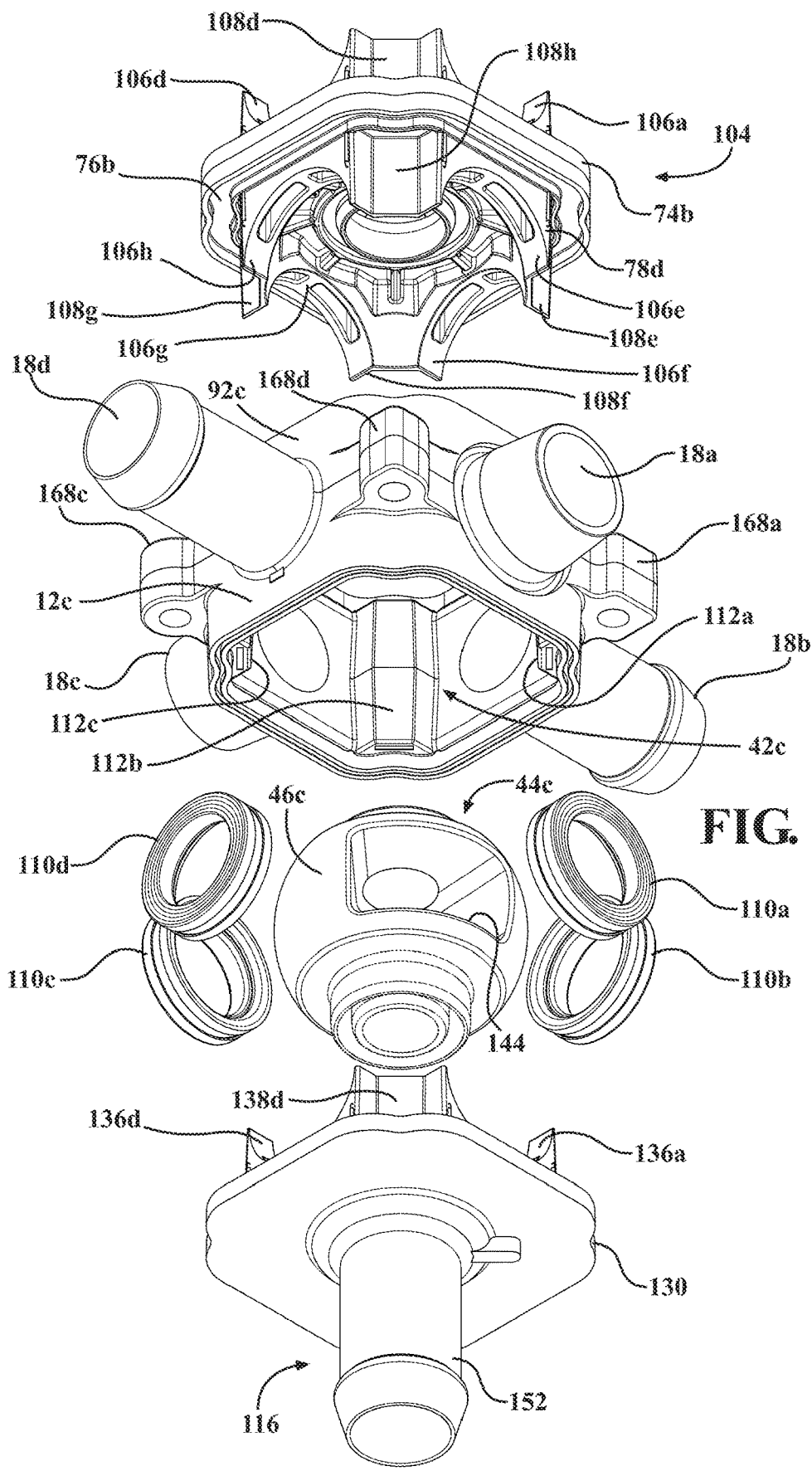
FIG. 15B is a ninth partial exploded view of several components which are part of a coolant flow control module, according to embodiments of the present invention.
Figure 17:
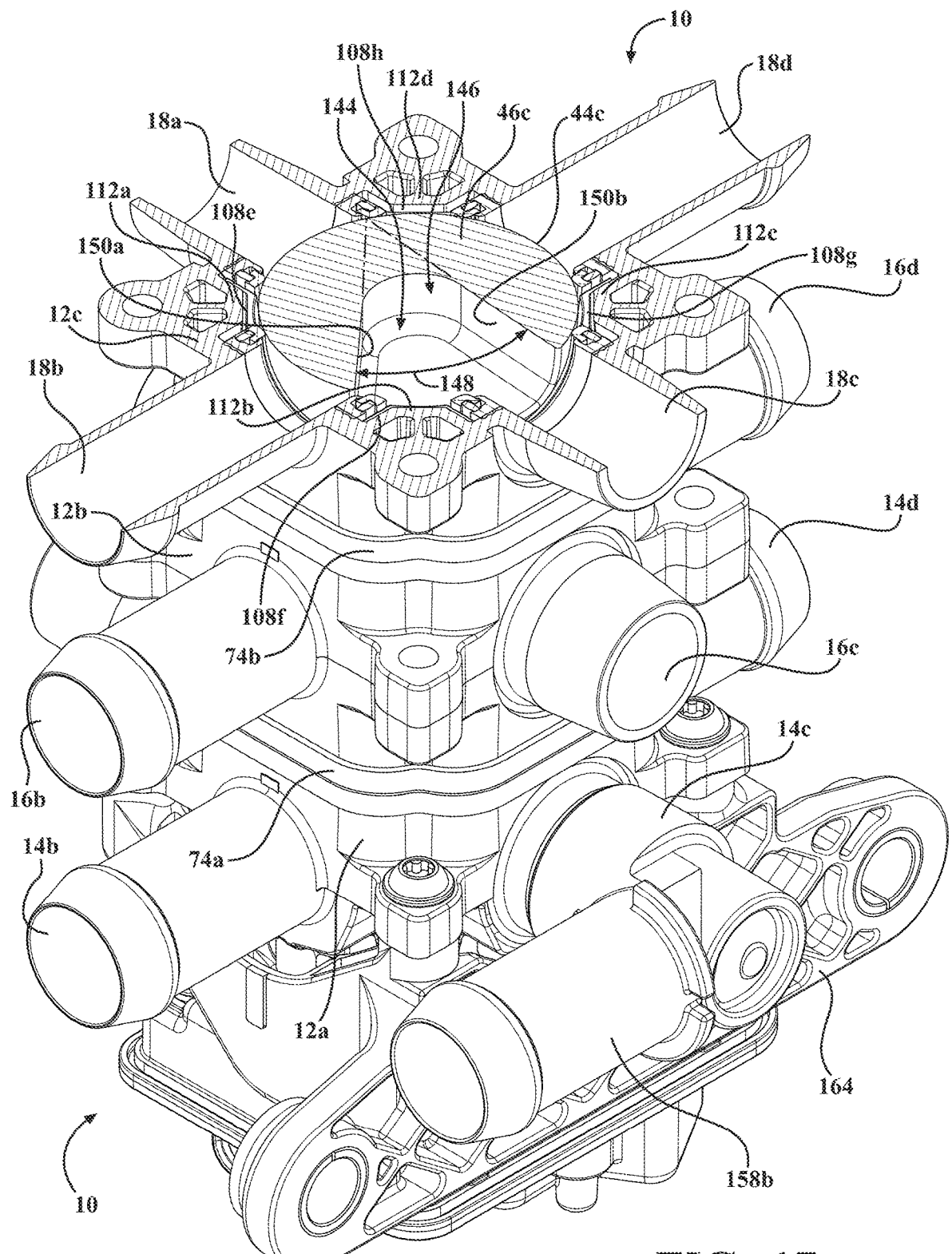
FIG. 17 is a sectional view taken along lines 17-17 in FIG. 1A.

The second intermediate inner housing 104 also includes another circumferential wall 78d having a second plurality of semicircular recesses 106e,106f,106g,106h, where the circumferential wall 78d is located in the cavity 42c when the coolant flow control module 10 is assembled. A third plurality of seals 110a,110b,110c,110d is located in the cavity 42c of the third outer housing 12c, and each of the seals 110a,110b,110c,110d is partially disposed in and supported by a corresponding one of the semicircular recesses 106e,106f,106g,106h of the circumferential wall 78d. Both circumferential walls 78c,78d are shaped in a similar manner. As shown in FIGS. 15A-15B and 17, the circumferential wall 78d also has four keyways 108e,108f,108g,108f which are engaged with four correspondingly shaped protrusions 112a,112b,112c,112d formed as part of the third outer housing 12c which help to ensure proper alignment between the third outer housing 12c and the second intermediate inner housing 104 during assembly. Each of the seals 110a,110b, 110c,110d includes a groove and is shaped similar to the seals 56a,56b,56c,56d and is of similar construction.

Referring to FIGS. 3, 11-13B, and 15A-16B, the first portion 170 of the first channel 118a also extends through an aperture 104a of the second intermediate inner housing 104. There is a cylindrical wall 126 having an outer tab 126a which is engaged with an upper notch 128a integrally formed as part of an upper cylindrical wall 128, where the upper cylindrical wall 128 is integrally formed as part of a third rotor 44c. In this embodiment, the cylindrical wall 126 and the inner cylindrical wall 120 are integrally formed with one another, and are both part of the first channel 118a, but it is within the scope of the invention that the cylindrical wall 126 may be formed separately from the inner cylindrical wall 120. A portion of the cylindrical wall 126 is also partially surrounded by the upper cylindrical wall 128 when the coolant flow control module 10 is assembled. The upper cylindrical wall 128 also extends through and is in contact with the aperture 104a of the second intermediate inner housing 104.

The second channel 118b of the second rotor 44b is generally straight and extends through the second rotor 44b, and also has a generally circular cross-section, but it is within the scope of the invention that the second channel 118b may be other shapes as well.

Referring now to FIGS. 1A-1B, 3, 10-12, and 15A-17, connected to the third outer housing 12c is a side housing, shown generally at 116. The side housing 116 includes an outer lip portion 130 attached to a wall portion 132. Integrally formed with the wall portion 132 is a circumferential wall 134 having a plurality of semicircular recesses 136a, 136b,136c,136d, where the circumferential wall 134 is located in the cavity 42c when the coolant flow control module 10 is assembled. Each of the seals 110a,110b,110c, 110d is partially disposed in and supported by a corresponding one of the semicircular recesses 136a,136b,136c,136d of the circumferential wall 134. The seals 110a,110b,110c,110d are therefore supported by the semicircular recesses 106e, 106f,106g,106h of the circumferential wall 78d and the semicircular recesses 136a,136b,136c,136d of the circumferential wall 134. The circumferential wall 134 also has four keyways 138a,138b,138c,138d which are engaged with the four correspondingly shaped protrusions 112a,112b, 112c,112d formed as part of the third outer housing 12c which help to ensure proper alignment between the third outer housing 12c and the side housing 116 during assembly.

The third rotor 44c is located in the cavity 42c of the third outer housing 12c, and is in sliding contact with the seals 110a,110b,110c,110d, and also rotates about the axis 60. The third rotor 44c has a body portion 46c, and integrally formed as part of the body portion 46c is one channel, shown generally at 144. The channel 144 is substantially 90°, but it is within the scope of the invention that the channel 144 may be formed at other angles as well. The channel 144 also includes a tapered portion 146 such that fluid is able to be dispersed from the tapered portion 146 of third rotor 44c to multiple ports. Conversely, fluid is also able to flow into the third rotor 44c through tapered portion 146 from multiple ports. Referring to FIG. 17, the tapered portion 146 is formed to have an angle 148, more specifically, there are sidewalls 150a,150b which are positioned at the angle 148 relative to one another. The angle 148 of the sidewalls 150a,150b may be different in various embodiments to change and facilitate the fluid flow between the ports 18a, 18b,18c,18d, and an outer port 152 formed as part of the third outer housing 12c.

When the side housing 116 is connected to the third outer housing 12c, part of the outer lip portion 130 circumscribes part of the sidewall 92c of the third outer housing 12c, and the sidewall 92c contacts the wall portion 132, providing a seal between the side housing 116 and the third outer housing 12c. In one embodiment, the sidewall 92c is welded to the wall portion 132, but it is within the scope of the invention that other types of connections may be used, such as an adhesive, or other types of welding. In an embodiment, an O-ring or other type of seal may be disposed between the sidewall 92c and the wall portion 132.

Figure 16A:
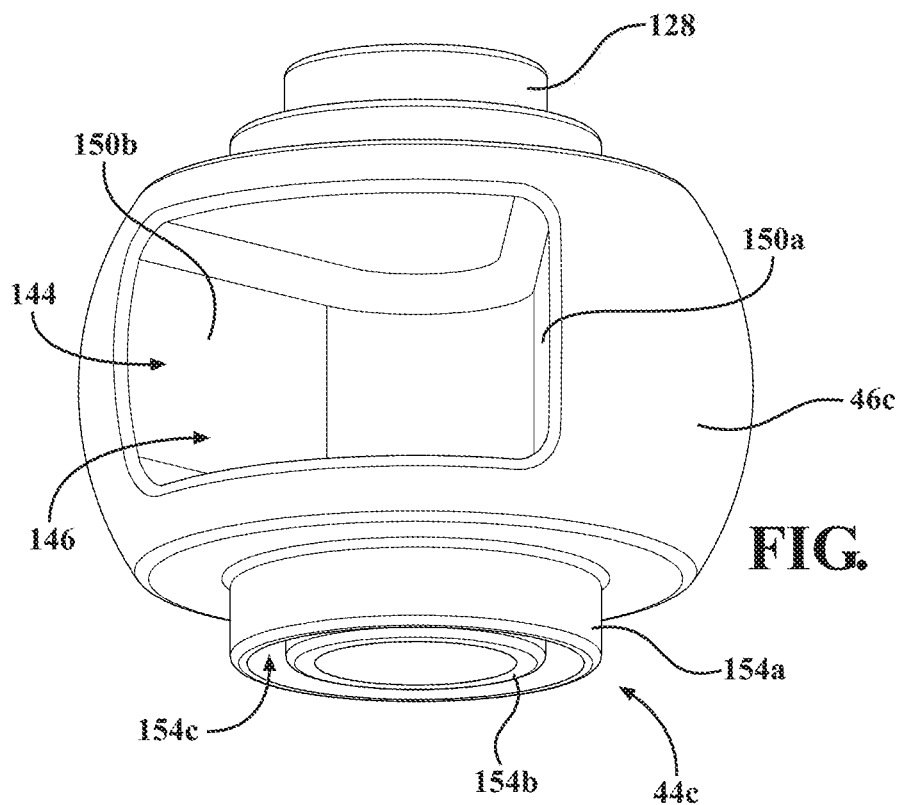
FIG. 16A is a first perspective view of a third rotor used as part of a coolant flow control module, according to embodiments of the present invention.
Figure 16B:
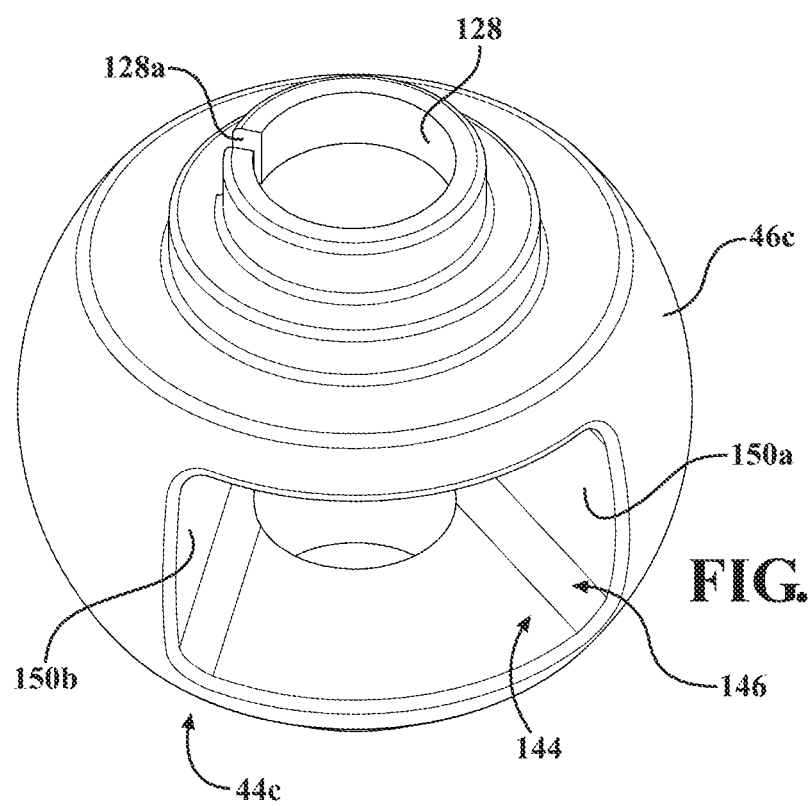
FIG. 16B is a second perspective view of a third rotor used as part of a coolant flow control module, according to embodiments of the present invention.

Referring to FIGS. 3 and 16A-16B, also formed as part of the third rotor 44c is a first circumferential wall 154a and a second circumferential wall 154b, and disposed in between the walls 154a,154b is a groove 154c. When the third rotor 44c is located in the third outer housing 12c, and the side housing 116 is connected to the third outer housing 12c, a circular flange portion 156 is disposed in the groove 154c, providing proper alignment of the third rotor 44c.

Each of the ports 14a,14b,14c,14d,16a,16b,16c,16d, 18a, 18b,18c,18d,152, may be connected to various conduits having different shapes, which also may be configured at different angles. In FIGS. 1A and 1B, there are two conduits, a first conduit 158a is connected to the port 14a, and a second conduit 158b is connected to the port 14c. The conduits 158a,158b in the embodiment shown are formed to have a 90° angle, but it is within the scope of the invention that the conduits 158a,158b may be straight, or formed at various angles to meet various packaging requirements. In the embodiment shown, the conduits 158a,158b are welded to the ports 14a,14c, but it is within the scope the invention that the conduits 158a,158b may be connected to the ports 14a,14c using other connections, such as a snap fit connection with a seal, a threaded connection, or other suitable fluid-tight connection.

As shown in FIGS. 1A-2A, and 4-8, the first outer housing 12a includes a plurality of mounting flanges 160a,160b, 160c,160d, and each of the flanges 160a,160b,160c,160d includes an aperture 162a,162b,162c,162d. A bracket 164 is connected to three of the flanges 160a,160b,160c. More specifically, the bracket 164 includes three apertures (not shown), and corresponding fasteners 166a,166b,166c extend through the apertures of the bracket 164 and three apertures 162a,162b,162c of the flanges 160a,160b,160c. The second outer housing 12b and the third outer housing 12c also include flanges 166a,166b,166c,166d and flanges 168a,168b,168c,168d respectively. The flanges 166a,166b, 166c,166d and flanges 168a,168b,168c,168d all have corresponding apertures, which may be used to connected one of more of the outer housings 12b,12c to various brackets or other components, such that the cooling module 10 may be positioned in any number of orientations to meet various packaging requirements.

Referring to the Figures generally, in operation, the electric motor 26 rotates the gears 28a,28b,28c,28d,28e,28f,28g, 28h of the gearset 30, which in turn rotates the rotors 44a,44b,44c in unison. In one example the rotors 44a,44b, 44c are rotated to a first orientation, where channel 48a is in fluid communication with the port 14a and the channel 48b is closed off from the channels 14a,14b,14c,14d. In the first orientation, the channel 118a is in fluid communication with the port 16a, and the channel 118b is also closed off from the channels 16a,16b,16c,16d. Also in the first orientation, the channel 144 of the third rotor 44c is in fluid communication with the port 18a. Therefore, when the rotors 44a,44b,44c are rotated to the first orientation, port 14a and port 16a are in fluid communication with one another, and port 18a is in fluid communication with port 152.

The rotors 44a,44b,44c may be rotated to a second orientation, where the channel 48a is in fluid communication with both ports 14a,14b, and channel 48b is in fluid communication with ports 14c,14d. In the second orientation, the channel 118a is closed off from ports 16a,16b,16c,16d, and the channel 118b is in fluid communication with both ports 16c,16d. Also in the second orientation, the channel 144 is in fluid communication with ports 18a,18b. Therefore, when the rotors 44a,44b,44c are rotated to the second orientation, port 14a and port 14b are in fluid communication with one another, and port 14c and port 14d are in fluid communication with one another. In the second orientation, port 16c and port 16d are in fluid communication with one another, and port 152 is in fluid communication with port 18a and port 18b.

The rotors 44a,44b,44c may be rotated to a third orientation, where the channel 48a is in fluid communication with port 14b, and the channel 48b is closed off from the channels 14a,14b,14c,14d, as shown in FIG. 3. In the third orientation, the channel 118a is in fluid communication with the port 16b, and the channel 118b is also closed off from the channels 16a,16b,16c,16d, also shown in FIG. 3. Also in the third orientation, the channel 144 of the third rotor 44c is in fluid communication with the port 18b. Therefore, when the rotors 44a,44b,44c are rotated to the third orientation, port 14b and port 16b are in fluid communication with one another, and port 18b is in fluid communication with port 152.

The rotors 44a,44b,44c may be rotated to a fourth orientation, where the channel 48a is in fluid communication with both ports 14b,14c, and channel 48b is in fluid communication with ports 14a,14d. In the fourth orientation, the channel 118a is closed off from ports 16a,16b,16c,16d, and the channel 118b is in fluid communication with both ports 16a,16d. Also in the fourth orientation, the channel 144 is in fluid communication with ports 18b,18c. Therefore, when the rotors 44a,44b,44c are rotated to the fourth orientation, port 14b and port 14c are in fluid communication with one another, and port 14a and port 14d are in fluid communication with one another. In the fourth orientation, port 16a and port 16d are in fluid communication with one another, and port 152 is in fluid communication with port 18b and port 18c.

The rotors 44a,44b,44c may be rotated to a fifth orientation, where the channel 48a is in fluid communication with port 14c, and the channel 48b is closed off from the channels 14a,14b,14c,14d. In the fifth orientation, the channel 118a is in fluid communication with the port 16c, and the channel 118b is also closed off from the channels 16a,16b,16c,16d. Also, in the fifth orientation, the channel 144 of the third rotor 44c is in fluid communication with the port 18c, shown in FIG. 17. Therefore, when the rotors 44a,44b,44c are rotated to the fifth orientation, port 14c and port 16c are in fluid communication with one another, and port 18c is in fluid communication with port 152.

The rotors 44a,44b,44c may be rotated to a sixth orientation, where the channel 48a is in fluid communication with both ports 14c,14d, and channel 48b is in fluid communication with ports 14a,14b. In the sixth orientation, the channel 118a is closed off from ports 16a,16b,16c,16d, and the channel 118b is in fluid communication with both ports 16a,16b. Also, in the sixth orientation, the channel 144 is in fluid communication with ports 18c,18d. Therefore, when the rotors 44a,44b,44c are rotated to the sixth orientation, port 14c and port 14d are in fluid communication with one another, and port 14a and port 14b are in fluid communication with one another. In the sixth orientation, port 16a and port 16b are in fluid communication with one another, and port 152 is in fluid communication with port 18c and port 18d.

The rotors 44a,44b,44c may be rotated to a seventh orientation, where the channel 48a is in fluid communication with port 14d, and the channel 48b is closed off from the channels 14a,14b,14c,14d. In the seventh orientation, the channel 118a is in fluid communication with the port 16d, and the channel 118b is also closed off from the channels 16a,16b,16c,16d. Also, in the seventh orientation, the channel 144 of the third rotor 44c is in fluid communication with the port 18d. Therefore, when the rotors 44a,44b,44c are rotated to the seventh orientation, port 14d and port 16d are in fluid communication with one another, and port 18d is in fluid communication with port 152.

The rotors 44a,44b,44c may be rotated to an eighth orientation, where the channel 48a is in fluid communication with both ports 14a,14d, and channel 48b is in fluid communication with ports 14b,14c. In the eighth orientation, the channel 118a is closed off from ports 16a,16b,16c,16d, and the channel 118b is in fluid communication with both ports 16b,16c. Also, in the eighth orientation, the channel 144 is in fluid communication with ports 18a,18d. Therefore, when the rotors 44a,44b,44c are rotated to the eighth orientation, port 14a and port 14d are in fluid communication with one another, and port 14b and port 14c are in fluid communication with one another. In the eighth orientation, port 16b and port 16c are in fluid communication with one another, and port 152 is in fluid communication with port 18a and port 18d.

Figure 8:
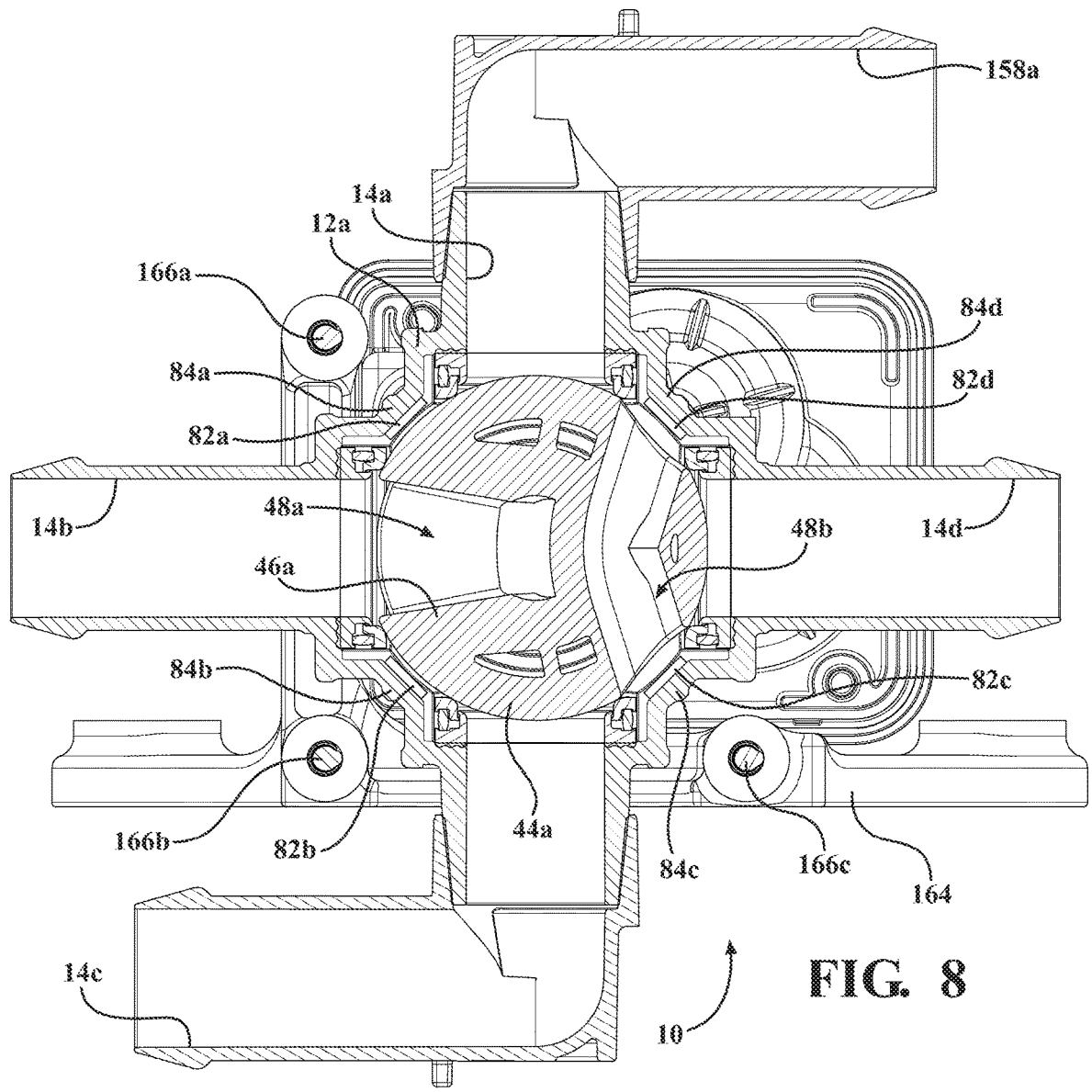
FIG. 8 is a sectional view taken along lines 8-8 in FIG. 1A.
Figure 9A:
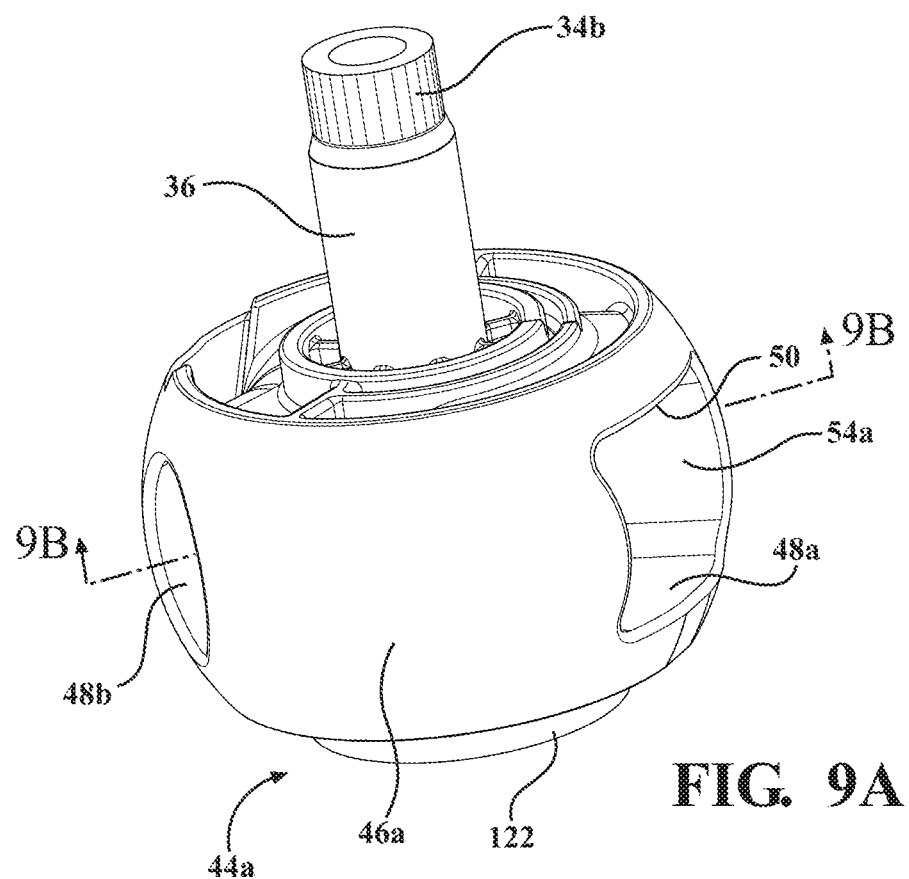
FIG. 9A is a perspective view of a first rotor used as part of a coolant flow control module, according to embodiments of the present invention.
Figure 9B:
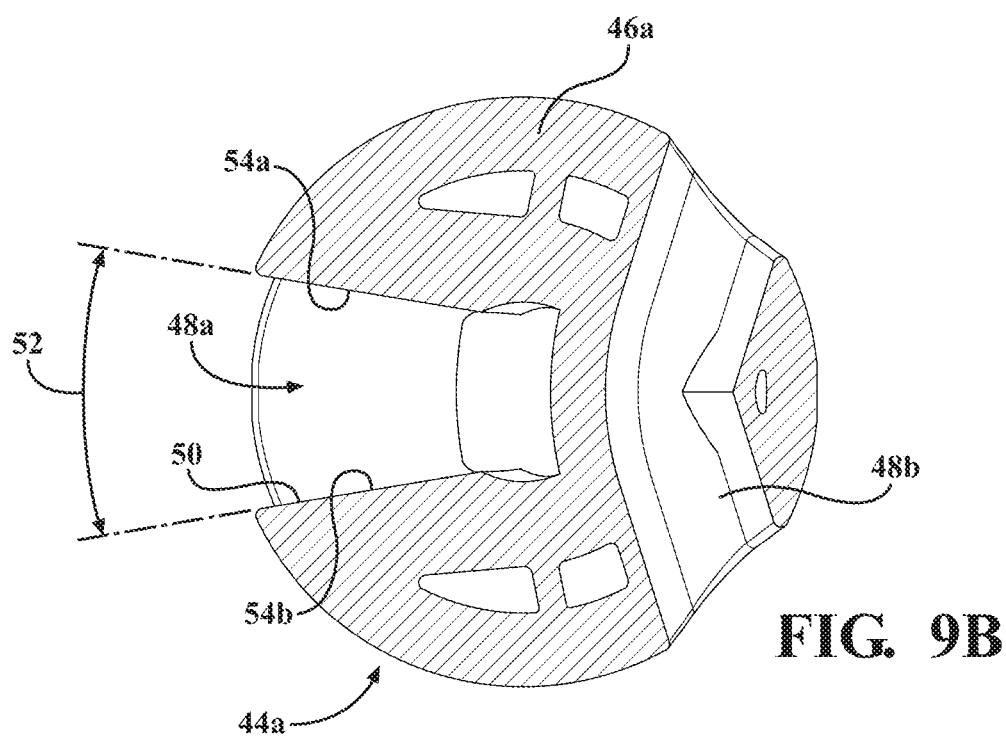
FIG. 9B is a sectional view taken along lines 9B-9B in FIG. 9A.
Figure 14:
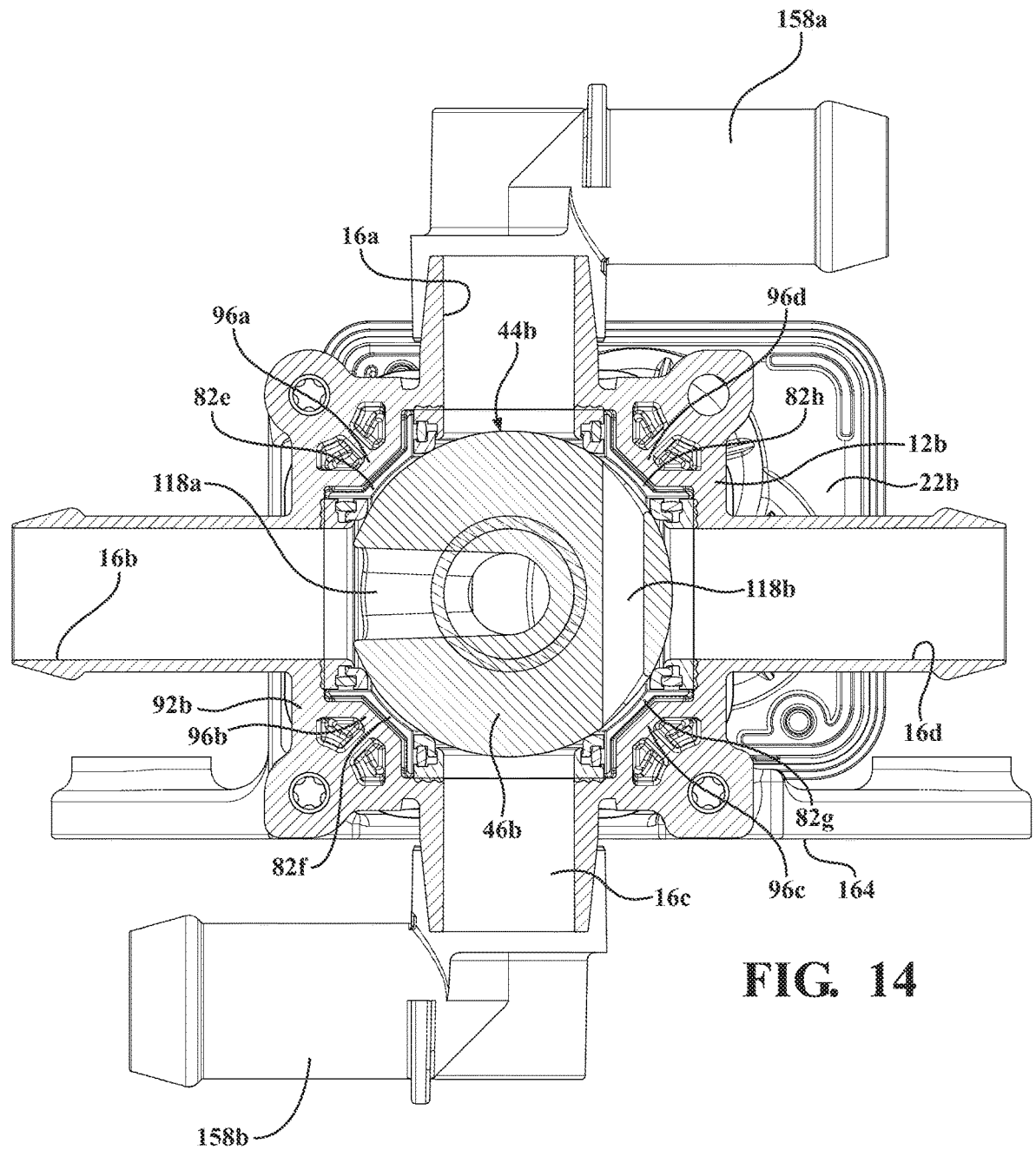
FIG. 14 is a sectional view taken along lines 14-14 in FIG. 1A.

Any of the ports 14a,14b,14c,14d,16a,16b,16c,16d, 18a, 18b,18c,18d,152 may be used as an inlet or an outlet, and therefore, there any many numerous possible flow paths and flow configurations. In a non-limiting example, when the rotors 44a,44b,44c are placed in the third orientation, as shown in FIGS. 8 and 14, fluid may flow from port 14b, through the first channel 48b of the first rotor 44a, through the first channel 118a of the second rotor 44b, and out of port 16b. Conversely, fluid may flow from port 16b, through the first channel 118a of the second rotor 44b, through the first channel 48b of the first rotor 44a, and through port 14b. Also, when the rotors 44a,44b,44c are placed in the third orientation, fluid may flow into port 18b, through the channel 144 of the third rotor 44c and through the port 152. Conversely, flow may flow from the port 152, through the channel 144 of the third rotor 44c, and through the port 18b. Varying flow paths and directions may be used in any of the other configurations as well.

The rotors 44a,44b,44c may also be configured differently relative to one another as well. The lower notch 122a of the first rotor 44a may be in different location on the lower cylindrical wall 122, the upper notch 128a of the second rotor 44b may be in a different location on the upper cylindrical wall 128, and the tabs 120a,126a of the second rotor 44b may be in different locations on the corresponding cylindrical walls 120,126, such the channels 48a,48b,118a, 118b,144 are oriented differently relative to one another, facilitating different flow paths and configurations.

The construction of the outer housings 12a,12b,12c is generally similar. The construction of the intermediate inner housings 72,104 is also similar. This allows for additional intermediate and outer housings to be included as part of the coolant flow control module 10, such that additional rotors may be used as well, and additional numerous flow paths and orientations are achieved. Furthermore, the coolant flow control module 10 may also be assembled without the second intermediate inner housing 72, the third outer housing 12c, and may also be assembled without the second outer housing 12b such that a reduced number of rotors may be used to create a reduced number of flow paths such that the coolant flow control module 10 may be used for any number of applications requiring different numbers of flow paths.

In the embodiment described above, all three rotors 44a,44b,44c rotate in unison. In other embodiments, movement of the rotors 44a,44b,44c may include a "lost motion" feature, where either or both of the lower notch 122a or the upper notch 128a may have different widths. In these embodiments, the first rotor 44a may rotate relative to the second rotor 44b and the third rotor 44c. Additionally, the first rotor 44a and second rotor 44b may rotate relative to the third rotor 44c. For example, the width of the lower notch 122a may be such that the first rotor 44a is able to be rotated 45° relative to the second rotor 44b and the third rotor 44c. The first rotor 44a may be able rotate more or less relative to the second rotor 44b and the third rotor 44c, depending upon the width of the lower notch 122a. Similarly, in one example the width of the upper notch 128a may be such that the first rotor 44a and the second rotor 44b are able to be rotated 45° relative to the third rotor 44c. The first rotor 44a and the second rotor 44b may be able rotate more or less relative to the third rotor 44c, depending upon the width of the upper notch 122a. The lost motion feature allows for relative movement between the rotors 44a,44b,44c, which in turn provides additional flow configurations.

It should also be noted that the angle 52 of the are sidewalls 54a,54b of the first rotor 44a and the angle 148 of the sidewalls 150a,150b of the third rotor 44c may be varied between being parallel to one another and 180°, such that a broad range of flow control may be achieved, allowing for different flow rates between the ports 14a,14b,14c,14d of the first outer housing 12a, and between the ports 18a,18b,18c, 18d of the third outer housing 12c and the outer port 152 of the side housing 116.

Figure 18:
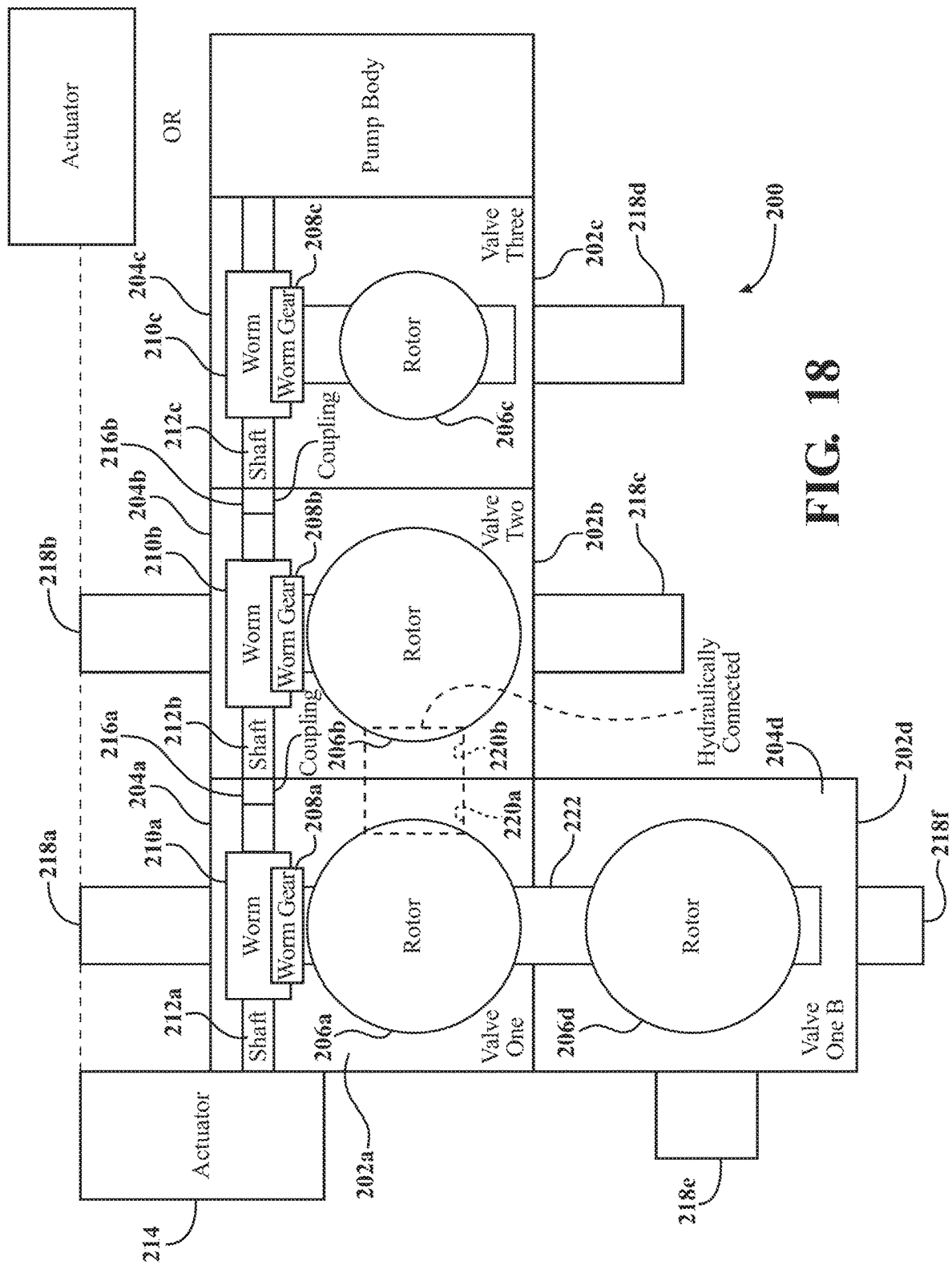
FIG. 18 is a diagram of a coolant flow control module having multiple valve modules, according to an alternate embodiment of the present invention.

An alternate embodiment of a coolant flow control module having a valve assembly which includes multiple valve modules is shown in FIG. 18 generally at 200. In the embodiment shown in FIG. 18, there is a first valve module 202a, connected to the first valve module 202a is a second valve module 202b, and connected to the second valve module 202b is a third valve module 202c. Also connected to the first valve module 202a is a fourth valve module 202d. Each of the valve modules 202a,202b,202c,202d includes a corresponding housing 204a,204b,204c,204d and corresponding rotor 206a,206b,206c,206d. Each rotor 206a,206b, 206c,206d is able to be rotated to direct fluid through each of the corresponding housings 204a,204b,204c,204d.

Three of the valve modules 202a,202b,202c also include a gear member, which in this embodiment is a spur gear 208a,208b,208c, and each spur gear 208a,208b,208c is in mesh with a corresponding worm 210a,210b,210c. Each spur gear 208a,208b,208c integrally formed as part of a corresponding rotor 206a,206b,206c. Each worm 210a, 210b,210c is mounted on a corresponding shaft 212a,212b, 212c, and each shaft 212a,212b,212c is mounted to one of the corresponding housings 204a,204b,204c.

The first shaft 212a is connected to an actuator 214, which is able to rotate the first shaft 212a in a first direction (clockwise) or a second direction (counterclockwise). The first shaft 212a is selectively connected to the second shaft 212b through a first coupling 216a, and the second shaft 212b is selectively connected to the third shaft 212c through a second coupling 216b.

There are also several ports which facilitate the flow of fluid through the various housings 204a,204b,204c,204d. More specifically, there is a first port 218a integrally formed as part of the first housing 204a. There is a second port 218b and a third port 210c integrally formed as part of the second housing 204b. There is also a fourth port 218d integrally formed as part of the third housing 204c. Additionally, there is a fifth port 218e and a sixth port 218f integrally formed as part of the fourth housing 204d. Each of the ports 218a, 218b,218c,218e,218f may function as an inlet port or an outlet port, depending upon the orientation of each of the rotors 206a,206b,206c,206d.

In this embodiment, there are also ports 220a,220b integrally formed as part of the first housing 204a and the second housing 204b, which are shown in phantom in FIG. 18, and provide fluid communication between the first housing 204a and the second housing 204b. It is also within the scope of the invention that there may be ports formed as part of the second housing 204b and the third housing 204c such that there is fluid communication between the second housing 204b and the third housing 204c.

The fourth rotor 206d is connected to the first rotor 206a such that both rotors 206a,206d rotate in unison. The fourth rotor 206d may be connected to the first rotor 206a through the use of any suitable connector, or connection device. A non-limiting example of how the rotors 206a,206d may be connected is a shaft 222, as shown in FIG. 18, but it is within the scope of the invention that the rotors 206a,206d may be connected through the use of other connection devices, such as, but not limited to, one or more gears, a locking mechanism, or the like.

In operation, when the couplings 216a,216b are deactivated, the actuator 214 rotates the shaft 212a in the first direction or the second direction, which in turn rotates the worm 210a, and therefore also rotates the spur gear 208a and the rotors 206a,206d. Fluid is then directed through the various ports 218a,218e,218f,220a,220b, depending on the positions of the rotors 206a,206d.

Figure 19B:
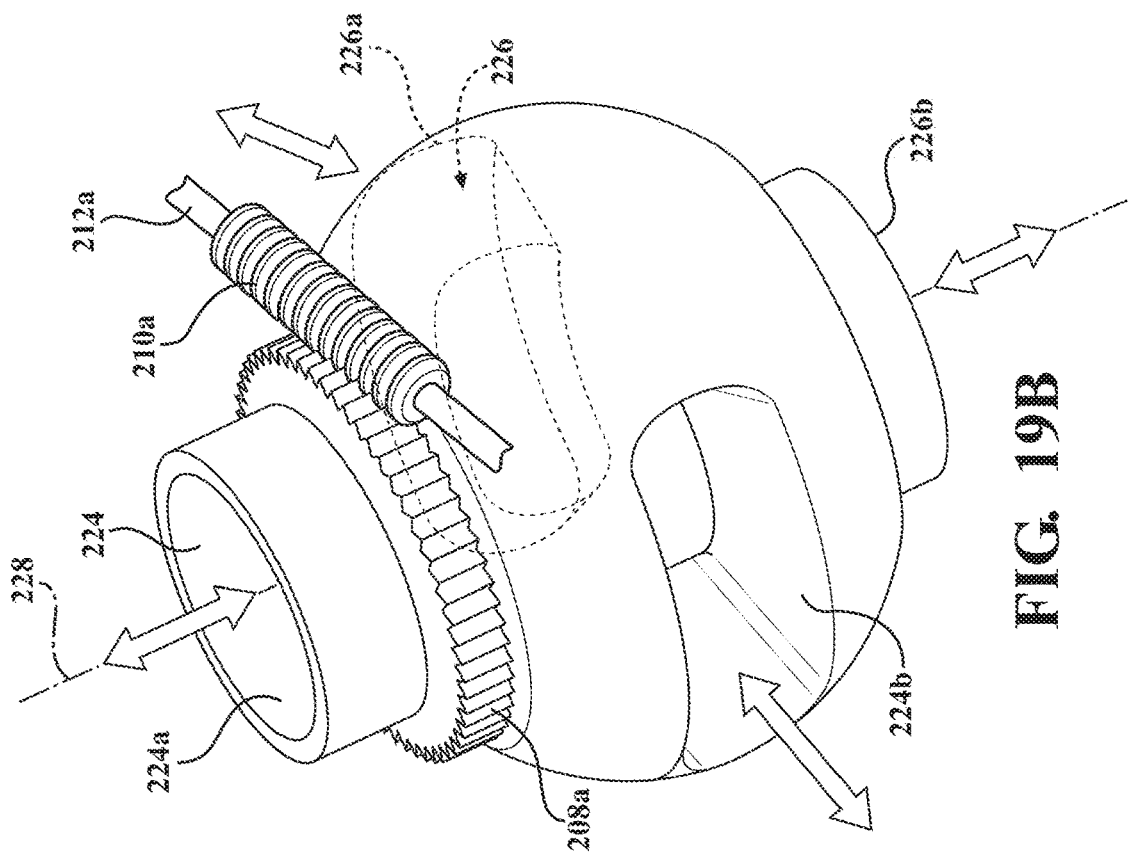
FIG. 19B is a perspective view of a rotor used as part of a coolant flow control module having multiple valve modules, according to an alternate embodiment of the present invention.
Figure 19A:
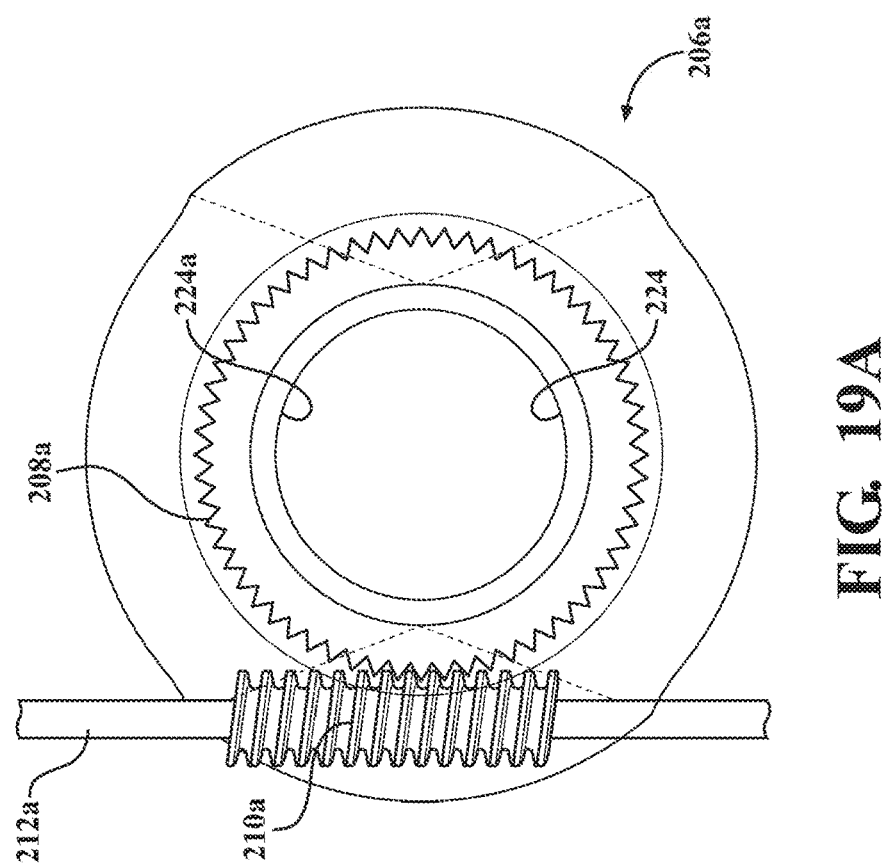
FIG. 19A is a top view of a rotor used as part of a coolant flow control module having multiple valve modules, according to an alternate embodiment of the present invention.
Figure 20A:
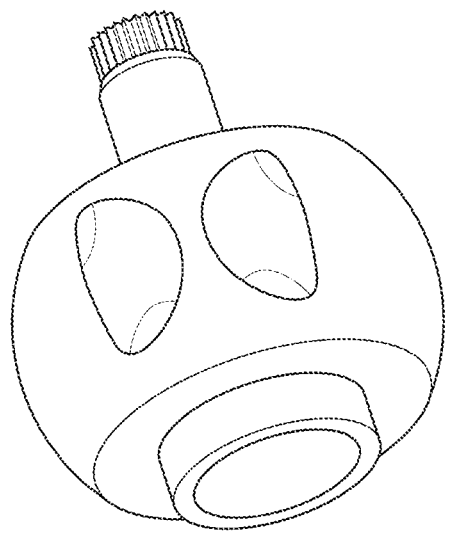
FIG. 20A is a first perspective view of another example of a rotor used as part of a coolant flow control module having multiple valve modules, according to embodiments of the present invention.
Figure 20B:
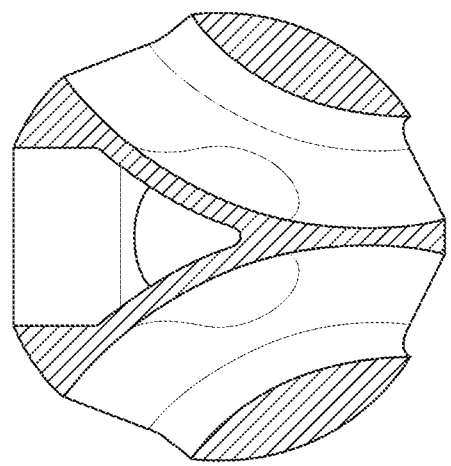
FIG. 20B is a bottom sectional view of another example of a rotor used as part of a coolant flow control module having multiple valve modules, according to embodiments of the present invention.
Figure 20C:
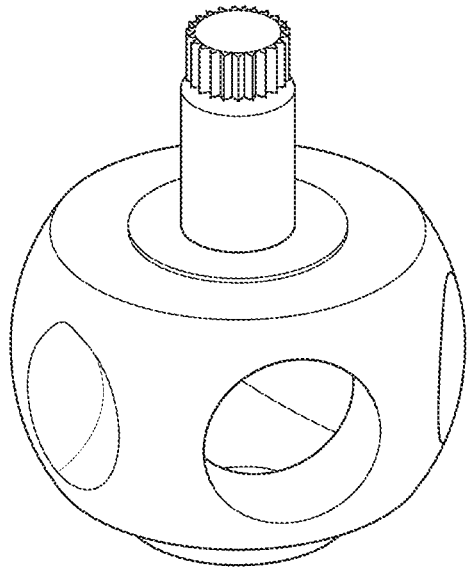
FIG. 20C is a second perspective view of another example of a rotor used as part of a coolant flow control module having multiple valve modules, according to embodiments of the present invention.
Figure 20D:
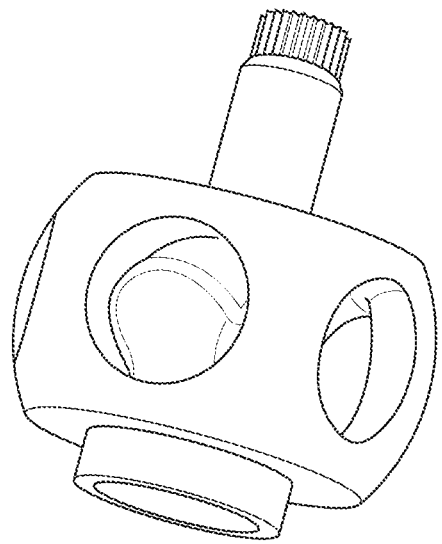
FIG. 20D is a third perspective view of another example of a rotor used as part of a coolant flow control module having multiple valve modules, according to embodiments of the present invention.
Figure 21B:
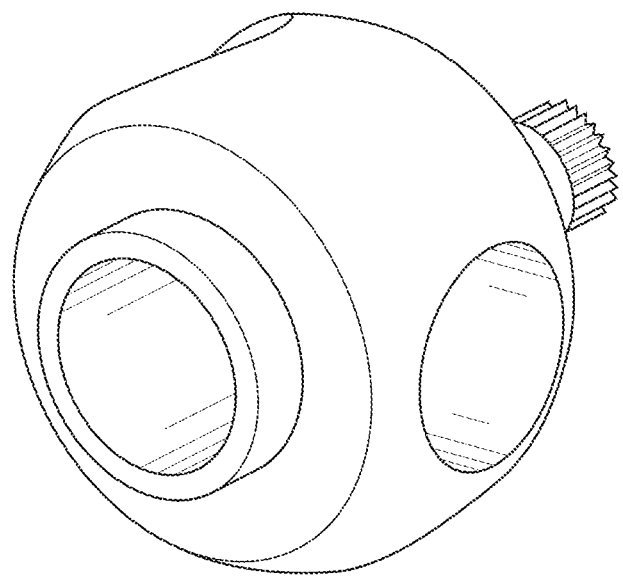
FIG. 21B is a second perspective view of yet another example of a rotor used as part of a coolant flow control module having multiple valve modules, according to embodiments of the present invention.
Figure 21A:
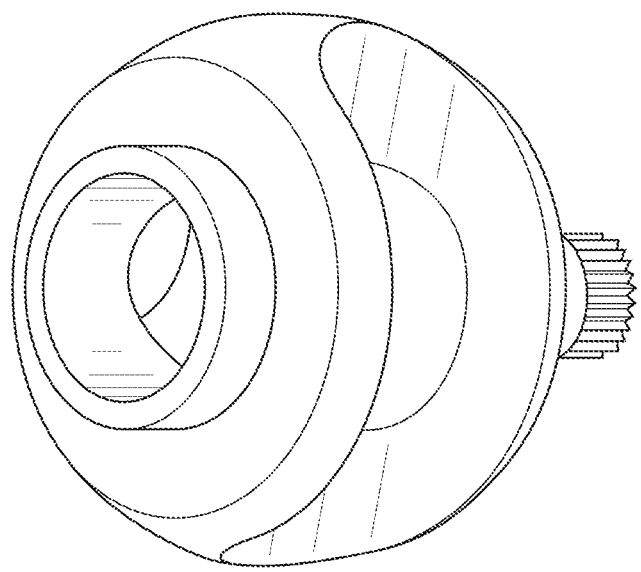
FIG. 21A is a first perspective view of yet another example of a rotor used as part of a coolant flow control module having multiple valve modules, according to embodiments of the present invention.

The couplings 216a,216b may be actuated to couple first shaft 212a to the second shaft 212b, and couple the second shaft 212b to the third shaft 212c, such that the shafts 212b,212c also rotate as the first shaft 212a is rotated by the actuator 214. As with the first module 202a, rotation of the shaft 212b rotates the worm 210b, and therefore also rotates the spur gear 208b and the rotor 206b. Furthermore, rotation of the shaft 212c rotates the worm 210c, and therefore also rotates the spur gear 208c and the rotor 206c. Rotation of the rotors 206b,206c facilitates or prevent the flow of fluid through the ports 218b,218c An example of a rotor 206b used in one or more of the modules 202a,202b,202c,202d is shown in FIGS. 19A-19B. In the example shown, the rotor 206b includes a first channel 224 which facilitates flow between a first aperture 224a and a second aperture 224b. The rotor 206b also includes a second channel 226 which facilitates flow between a third aperture 226*a* and a fourth apertures 226*b*. The first channel 224 and the second channel 226 are fluidically isolated from one another such that the first channel 224 and the second channel 226 are not in fluid communication with one another.

As shown in FIGS. 19A and 19B, the spur gear 208*a* is connected to the rotor 206*b* such that a portion of the first channel 224 extends through the spur gear 208*a*. Furthermore, the rotor 206*b* rotates about an axis 228, and a portion of the first channel 224 is located such that there is flow along axis 228. A portion of the second channel 226 is also located such that there is flow along axis 228.

Other examples of rotors are shown in FIGS. 20A-21B, which depict different possible channels having different flow paths through the rotor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a coolant flow control module, including:
        a plurality of outer housings;
        a plurality of rotors, each of the plurality of rotors disposed in a corresponding one of the plurality of outer housings;
        a plurality of channels, each of the plurality of channels integrally formed as a part of a corresponding one of the plurality of rotors;
        a first plurality of ports integrally formed as part of a first of the plurality of outer housings;
        a second plurality of ports integrally formed as part of a second of the plurality of outer housings;
        an actuator connected to a first of the plurality of rotors; and
        a plurality of orientations, the plurality of rotors operable for being placed in one of the plurality of orientations;
        a first plurality of channels integrally formed as part of a first of the plurality of rotors; and
        a second plurality of channels integrally formed as part of a second of the plurality of rotors;
        a tapered portion formed as part of one of the first plurality of channels, the tapered portion able to distribute fluid to, or receive fluid from, two of the first plurality of ports when the first and the second of the plurality of rotors are placed in at least one of the plurality of orientations;
        wherein the first of the plurality of rotors is disposed in a first of the plurality of outer housings, the second of the plurality of rotors is disposed in a second of the plurality of outer housings and connected to the first of the plurality of rotors, and the actuator rotates the first of the plurality of rotors and the second of the plurality of rotors to one of the plurality of orientations such that at least one of the first plurality of channels is in fluid communication with at least one of the first plurality of ports, and at least one of the second plurality channels is in fluid communication with at least one of the second plurality of ports.

2. The apparatus of claim 1, wherein one of the first plurality of channels is in continuous fluid communication with one of the second plurality of channels, such that when the plurality of rotors is placed in one of the plurality of orientations, one of the first plurality of ports is in fluid communication with one of the second plurality of ports.

3. The apparatus of claim 1, wherein one of the first plurality of channels is operable for providing fluid communication between two of the first plurality of ports, when the plurality of rotors is placed in at least one of the plurality of orientations.

4. The apparatus of claim 1, wherein one of the second plurality of channels is operable for providing fluid communication between two of the second plurality of ports, when the plurality of rotors is placed in at least one of the plurality of orientations.

5. The apparatus of claim 1, further comprising:
    a lower cylindrical wall formed as part of a first of the plurality of rotors;
    a lower notch integrally formed as part of the lower cylindrical wall of the first of the plurality of rotors;
    an inner cylindrical wall formed as part of a second of the plurality of rotors; and
    an exterior tab integrally formed as part of the inner cylindrical wall of the second of the plurality of rotors;
    wherein the lower cylindrical wall formed as part of the first of the plurality of rotors is in contact with the inner cylindrical wall formed as part of the second of the plurality of rotors, and the exterior tab is engaged with the lower notch such that the first of the plurality of rotors and the second of the plurality of rotors rotate in unison.

6. The apparatus of claim 5, wherein the cylindrical wall of the second of the plurality of rotors is part of one of the second plurality of channels, and a portion of the cylindrical wall of the second of the plurality of rotors extends into the one of the first plurality of channels such that the first of the plurality of rotors is in fluid communication with the second of the plurality of rotors.

7. The apparatus of claim 1, further comprising:
    a first coupling selectively connecting the first of the plurality of rotors and the second of the plurality of rotors;
    wherein the actuator changes the position of the first of the plurality of rotors relative to the second of the plurality of rotors when the coupling disconnects the first of the plurality of rotors and the second of the plurality of rotors, and the first of the plurality of rotors is rotated.

8. The apparatus of claim 1, further comprising:
    a third plurality of ports integrally formed as part of a third of the plurality of outer housings;
    a third of the plurality of rotors disposed in the third of the plurality of outer housings, the third of the plurality of rotors connected to the second of the plurality of rotors;
    a side housing connected to the third of the plurality of housings;
    an outer port integrally formed as part of the side housing; and
    at least one channel integrally formed as part of the third of the plurality of rotors;
    wherein the at least one channel of the third of the plurality rotors is in continuous fluid communication with the outer port, such that when the first, the second, and the third of the plurality of rotors are placed in at least one of the plurality of orientations, one of the third plurality of ports is in fluid communication with the outer port.

9. The apparatus of claim 8, further comprising:
    a second coupling selectively connecting the second of the plurality of rotors and the third of the plurality of rotors;

wherein the actuator changes the position of the second of the plurality of rotors rotor relative to the third of the plurality of rotors when the second coupling disconnects the second of the plurality of rotors and the third of the plurality of rotors, and the second of the plurality of rotors is rotated.

10. The apparatus of claim 8, further comprising:
a cylindrical wall integrally formed as part of the second of the plurality of rotors;
an outer tab integrally formed as part of the cylindrical wall of the second of the plurality of rotors;
an upper cylindrical wall formed as part of the third of the plurality of rotors; and
an upper notch integrally formed as part of the upper cylindrical wall of the third of the plurality of rotors;
wherein the cylindrical wall formed as part of the second of the plurality of rotors is in contact with the upper cylindrical wall formed as part of the third of the plurality of rotors, and the outer tab is engaged with the upper notch, such that the second of the plurality of rotors and the third of the plurality of rotors rotate in unison.

11. A coolant flow control module having multiple valve modules, comprising:
a first outer housing;
a first rotor located in the first outer housing the first rotor comprising:
a first channel, comprising:
a tapered portion able to distribute fluid to, or receive fluid from, two of the first plurality of ports when the first rotor and the second rotor are placed in at least one of the plurality of orientations;
a second channel, the first channel of the first rotor is fluidically isolated from the second channel of the first rotor, and the second channel of the first rotor is in fluid communication with two of the first plurality of ports when the first rotor is placed in at least one of the plurality of orientations;
a second outer housing located adjacent the first outer housing;
a second rotor disposed in the second outer housing, the second rotor engaged with the first rotor such that the first rotor and the second rotor rotate in unison and are able to be placed in one of a plurality of orientations;
an actuator connected to the first rotor;
a first plurality of ports integrally formed as part of the first outer housing; and
a second plurality of ports integrally formed as part of the second outer housing;
wherein the actuator rotates the first rotor and the second rotor to at least one of the plurality of orientations such that fluid is able to flow into or out of one or more of the first plurality of ports through the first rotor, and fluid is able to flow into or out of one or more of the second plurality of ports through the second rotor, and the first channel is in continuous fluid communication with the second rotor and the first channel is in fluid communication with one of the first plurality of ports when the first rotor is placed in at least one of the plurality of orientations.

12. The coolant flow control module having multiple valve modules of claim 11, the second rotor further comprising:
a first channel integrally formed as part of the second rotor; and
a second channel integrally formed as part of the second rotor, such that the first channel of the second rotor is fluidically isolated from the second channel of the second rotor, and the second channel of the second rotor is in fluid communication with two of the second plurality of ports when the second rotor is placed in at least one of the plurality of orientations;
wherein the first channel of the first rotor is in continuous fluid communication with the first channel of the second rotor, such that when the first rotor and the second rotor are placed in at least one of the plurality of orientations, one of the first plurality of ports is in fluid communication with one of the second plurality of ports.

13. The coolant flow control module having multiple valve modules of claim 12, further comprising:
a lower cylindrical wall formed as part of the first rotor;
a lower notch integrally formed as part of the lower cylindrical wall of the first rotor;
an inner cylindrical wall formed as part of the second rotor;
an exterior tab integrally formed as part of the inner cylindrical wall of the second rotor;
wherein the lower cylindrical wall formed as part of the first rotor is in contact with the inner cylindrical wall formed as part of the second rotor, and the exterior tab is engaged with the lower notch such that the first rotor and the second rotor rotate in unison.

14. The coolant flow control module having multiple valve modules of claim 13, wherein the cylindrical wall of the second rotor is part of the first channel of the second rotor, and a portion of the cylindrical wall of second rotor extends into the first channel of the first rotor such that the first rotor is in fluid communication with the second rotor.

15. The coolant flow control module having multiple valve modules of claim 12, further comprising:
a first coupling selectively connecting the first rotor and the second rotor;
wherein the actuator changes the position of the first rotor relative to the second rotor when the coupling disconnects the first rotor and the second rotor, and the first rotor is rotated.

16. The coolant flow control module having multiple valve modules of claim 11, further comprising:
a third outer housing located adjacent the second outer housing;
a third plurality of ports integrally formed as part of the third outer housing;
a third rotor located in the third outer housing and engaged with the second rotor;
at least one channel integrally formed as part of the third rotor;
a side housing connected to the third outer housing; and
an outer port integrally formed as part of the side housing;
wherein the at least one channel of the third rotor is in continuous fluid communication with the outer port, such that when the first rotor, the second rotor, and the third rotor are placed in at least one of the plurality of orientations, at least one of the third plurality of ports is in fluid communication with the outer port.

17. The coolant flow control module having multiple valve modules of claim 16, wherein the at least one channel of the third rotor further comprising a tapered portion able to distribute fluid to, or receive fluid from, two of the third plurality of ports integrally formed as part of the third outer housing when the first rotor, the second rotor, and the third rotor are placed in one of the plurality of orientations.

18. The coolant flow control module having multiple valve modules of claim 16, further comprising:

a cylindrical wall integrally formed as part of the second rotor;

an outer tab integrally formed as part of the cylindrical wall of the second rotor;

an upper cylindrical wall formed as part of the third rotor;

an upper notch integrally formed as part of the upper cylindrical wall of the third rotor;

wherein the cylindrical wall formed as part of the second rotor is in contact with the upper cylindrical wall formed as part of the third rotor, and the outer tab is engaged with the upper notch, such that the second rotor and the third rotor rotate in unison.

19. The coolant flow control module having multiple valve modules of claim 16, further comprising:

a second coupling selectively connecting the second rotor to the third rotor;

wherein the actuator changes the position of the second rotor relative to the third rotor when the coupling disconnects the second rotor and the third rotor, and the second rotor is rotated.

20. A valve assembly having multiple valve modules, comprising:

a plurality of valve modules;

a plurality of shafts, each one of the plurality of shafts being part of a corresponding one of the plurality of valve modules;

an actuator connected to one of the plurality of shafts; and a plurality of couplings, each one of the plurality of couplings operable for selectively coupling two of the plurality of shafts;

a worm connected to one of the plurality of shafts;

a spur gear connected to the rotor such that the spur gear circumscribes one of the first channel or the second channel, the spur gear in mesh with the worm such that the spur gear and the rotor are rotated as the worm is rotated by one of the plurality of shafts;

wherein the actuator rotates a first of the plurality of shafts to configure a first of the plurality of valve modules to provide one or more flow paths, and when one or more of the plurality of couplings connects two or more of the shafts, one or more of the plurality of valve modules are configured to provide multiple flow paths.

21. The apparatus of claim 20, each of the plurality of valve modules further comprising:

a housing;

a plurality of ports, each of the plurality of ports formed as part of the housing;

a rotor disposed in the housing, the rotor selectively in fluid communication with the plurality of ports; and at least two flow paths formed by the orientation of the rotor relative to the housing and the plurality of ports;

wherein the rotor is placed in one of a plurality of orientations relative to the plurality of ports and the housing such that each of the plurality of orientations includes the at least two flow paths.

22. The apparatus of claim 21, the rotor further comprising:

a first channel integrally formed as part of the rotor;

a second channel integrally formed as part of the rotor, the second channel being fluidically isolated from the first channel;

an axis extending through the rotor, and the rotor is rotatable about the axis;

wherein at least a portion of one of the first channel or the second channel extends along the axis.

* * * * *